(12) United States Patent
Takahashi et al.

(10) Patent No.: US 8,720,634 B2
(45) Date of Patent: May 13, 2014

(54) WORKING VEHICLE

(75) Inventors: Koji Takahashi, Tokyo (JP); Nobuhiko Suzuki, Tokyo (JP); Tomoji Utsugi, Kawagoe (JP)

(73) Assignees: Mamiya-Op Co., Ltd., Tokyo (JP); Carib Design Service Inc., Tokyo (JP)

( * ) Notice: Subject to any disclaimer, the term of this patent is extended or adjusted under 35 U.S.C. 154(b) by 112 days.

(21) Appl. No.: 13/343,505

(22) Filed: Jan. 4, 2012

(65) Prior Publication Data

US 2013/0047566 A1 Feb. 28, 2013

(30) Foreign Application Priority Data

Aug. 31, 2011 (JP) ................. 2011-189837

(51) Int. Cl.
*B62D 11/02* (2006.01)

(52) U.S. Cl.
USPC ........................................... 180/252

(58) Field of Classification Search
USPC .......................................... 180/411, 252, 233
See application file for complete search history.

(56) References Cited

U.S. PATENT DOCUMENTS

| | | |
|---|---|---|
| 2,057,417 A | 10/1936 | Clapper |
| 2,984,850 A | 5/1961 | Law et al. |
| 3,744,653 A | 7/1973 | Jensen |
| 3,757,503 A | 9/1973 | Soldavini |
| 3,816,985 A | 6/1974 | Sorenson et al. |
| 3,816,986 A | 6/1974 | Van Der Gaast |
| 3,893,284 A | 7/1975 | Thon et al. |
| 3,949,540 A | 4/1976 | Christopherson et al. |
| 4,015,406 A | 4/1977 | Witt et al. |
| 4,203,276 A | 5/1980 | Plamper |
| 4,214,424 A | 7/1980 | Gobin |
| 4,487,007 A | 12/1984 | Mullet et al. |
| 4,523,788 A | 6/1985 | Prasad |
| 4,709,541 A | 12/1987 | Broman et al. |
| 4,726,177 A | 2/1988 | McGoughy |
| 4,731,983 A | 3/1988 | Yuki et al. |
| 4,736,575 A | 4/1988 | Fedeli |
| 4,829,754 A | 5/1989 | Shimamura et al. |
| 4,843,805 A | 7/1989 | Satoh |

(Continued)

FOREIGN PATENT DOCUMENTS

| | | |
|---|---|---|
| JP | 2002-253002 A | 9/2002 |
| JP | 2004-166543 | 6/2004 |
| NL | 1035029 C2 | 8/2009 |

OTHER PUBLICATIONS

Office Action mailed Nov. 15, 2012 for the related U.S. Appl. No. 13/343,451.

(Continued)

*Primary Examiner* — Kevin Hurley
(74) *Attorney, Agent, or Firm* — Leason Ellis LLP.

(57) ABSTRACT

The invention is a working vehicle that has high practicality and a high degree of freedom of a turning operation. A lawn mowing vehicle includes a lawn mowing unit that includes drum wheels driven so as to rotate about an axis Ax1 extending in a vehicle width direction as a rotational center, a frame that is connected to the lawn mowing unit, and a steering drive device that is provided in the frame. The steering drive device includes a pair of steered wheels that is disposed in the vehicle width direction, steering units that can independently steer the pair of steered wheels respectively, and wheel driving units that can rotationally drive the pair of steered wheels.

9 Claims, 20 Drawing Sheets

(56) References Cited

U.S. PATENT DOCUMENTS

| | | |
|---|---|---|
| 4,972,666 A | 11/1990 | Peruzzo |
| 4,984,420 A | 1/1991 | Samejima et al. |
| 4,989,917 A | 2/1991 | Schmidt, Jr. |
| 5,533,326 A | 7/1996 | Goman et al. |
| 5,628,169 A | 5/1997 | Stiller et al. |
| 7,853,373 B2 | 12/2010 | Traster et al. |
| 8,267,205 B2 * | 9/2012 | Ishii et al. .................... 180/6.44 |
| 2002/0017086 A1 | 2/2002 | Sallstrom et al. |
| 2002/0174634 A1 | 11/2002 | Franet et al. |
| 2002/0194826 A1 | 12/2002 | Schick et al. |
| 2005/0044836 A1 | 3/2005 | Goto et al. |
| 2009/0000839 A1 * | 1/2009 | Ishii et al. .................... 180/65.5 |
| 2011/0179759 A1 | 7/2011 | Goman et al. |
| 2012/0073895 A1 | 3/2012 | Nishi et al. |

OTHER PUBLICATIONS

Office Action mailed Dec. 3, 2012 for the related U.S. Appl. No. 13/343,562.

Office Action mailed Mar. 5, 2013 for the related U.S. Appl. No. 13/343,562.

* cited by examiner

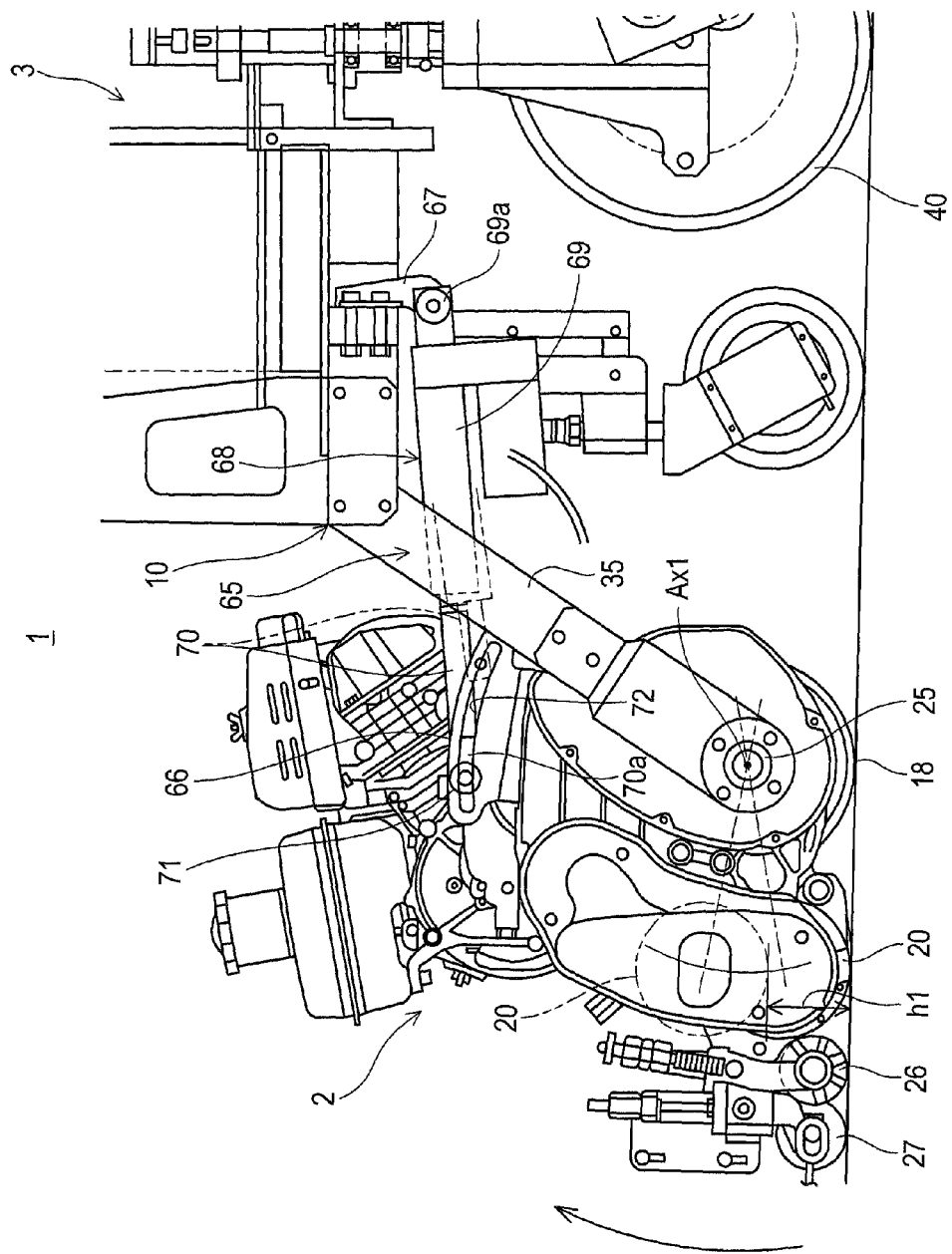

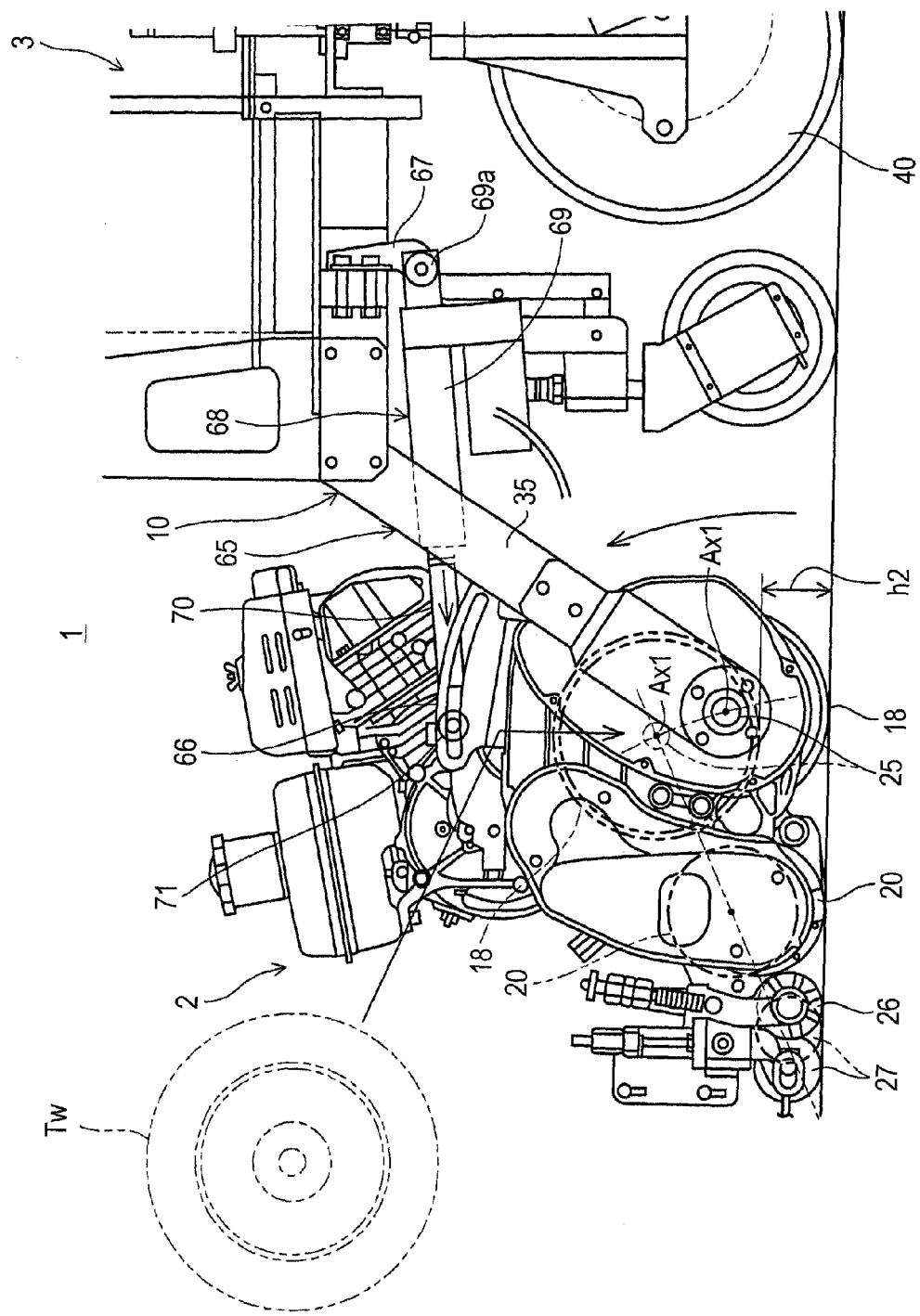

WORKING VEHICLE

CROSS-REFERENCE TO THE RELATED APPLICATIONS

This application claims the benefit of Japanese Patent Application No. 2011-189837, filed Aug. 31, 2011, which is incorporated entirely by reference herein.

FIELD OF THE INVENTION

The present invention relates to a working vehicle including a working unit that performs a predetermined work.

BACKGROUND OF THE INVENTION

Working vehicles, which perform various works, have been developed in the past. For example, as a lawn mowing vehicle that performs lawn mowing, there has been known a working vehicle that turns by independently driving left and right non-steered wheels, which cannot be steered, so as to give a rotation difference to the wheels (Patent Literature 1).

SUMMARY OF INVENTION

Technical Problem

Since the working vehicle disclosed in Patent Literature 1 turns by using a rotation difference between the left and right wheels, the friction between the road surface and the wheels during the turning of the working vehicle is apt to increase. It is necessary to tightly control the slip angle of a wheel in order to avoid damage to the road surface that is caused by the friction. For this reason, the working vehicle disclosed in Patent Literature 1 accompanies restriction on a turning operation that changes the direction of the working vehicle.

The invention provides a working vehicle that has high practicality and a high degree of freedom of a turning operation. Solution to problem According to an aspect of the invention, there is provided a working vehicle. The working vehicle includes a working unit that includes non-steered wheels driven so as to rotate about an axis extending in a vehicle width direction as a rotational center, a frame that is connected to the working unit, and a steering drive device that is provided in the frame. The steering drive device includes a pair of steered wheels that is disposed in the vehicle width direction, a steering device that independently steer the pair of steered wheels respectively, and a driving device that rotationally drive at least one steered wheel of the pair of steered wheels.

According to the working vehicle, it is possible to independently steer the respective steered wheels and to drive at least one steered wheel. For this reason, it is possible to make the working vehicle turn about one arbitrary point on the non-steered wheels, where rotation axes of the respective steered wheels intersects each other, by appropriately setting the steering angles of the respective steered wheels and rotationally driving at least one steered wheel. Accordingly, since the working vehicle can turn so as to correspond to the contents of a work of the working unit, it is possible to improve the practicality of the working vehicle.

According to another aspect of the invention, the working vehicle according to the aspect of the invention may further include a rocking member that extends in the vehicle width direction and is connected to the frame so as to rock about a rocking axis extending in a longitudinal direction of a vehicle body, and the pair of steered wheels may be provided on the rocking member with the steering device interposed therebetween. According to this aspect, the rocking member can absorb the unevenness or inclination of the road surface in the vehicle width direction by rocking. Accordingly, the road surface following properties of the working unit and the respective steered wheels are improved.

According to another aspect of the invention, in the working vehicle according to the aspect of the invention, the frame may be connected to the working unit so as to be rotatable about the axis and immovable in a direction of the axis. According to this aspect, the frame is rotated relative to the working unit about the axis, so that it is possible to absorb the unevenness of the road surface in the longitudinal direction of the vehicle body. Accordingly, the road surface following properties of the working unit and the respective steered wheels are improved.

According to another aspect of the invention, in the working vehicle according to the aspect of the invention, a caster angle of the steering device may be set to 0° with respect to each of the pair of steered wheels. According to this aspect, it is possible to reduce the operating resistance during steering, that is, the frictional resistance between the road surface and the steered wheels, as compared to when a caster angle is set to a value larger than 0°. Accordingly, it is possible to suppress damage to the road surface.

When a caster angle is set to 0°, a king pin axis of the steering device may be set to be orthogonal to a rotation axis of each of the pair of steered wheels. In this case, when the working vehicle is steered while being stopped, it is possible to make a friction range between the road surface and the steered wheel be smaller than when the king pin axis is set to a position separated from the rotation axis.

When the king pin axis is orthogonal to the rotation axis, the king pin axis of the steering device may be set to a predetermined position that is separated from a middle of the width of each of the pair of steered wheels. Since the king pin axis is set to this position, the direction of each steered wheel can be changed during the rolling of each steered wheel when the working vehicle is steered while being stopped. Accordingly, it is possible to reduce the friction between the road surface and the steered wheels when the working vehicle is steered while being stopped.

The predetermined position may be a position on a boundary of a contact area where each of the pair of steered wheels comes into contact with a road surface, or a position close to the boundary. In this case, when the working vehicle is steered while being stopped, it is possible to make the respective steered wheels roll while reducing the friction between the road surface and the respective steered wheels as much as possible. In addition, it is possible to make a distance from the steered wheel to the position of the king pin axis be shorter than when the king pin axis is set to a position separated far from the steered wheel. For this reason, it is possible to make the radius of rotation of each steered wheel during the change of the direction of each steered wheel be small. Accordingly, it is possible to contribute to the reduction of the size of the steering drive device.

According to another aspect of the invention, in the working vehicle according to the aspect of the invention, the frame may include inclined portions that are connected to the working unit and extend obliquely toward the upper side of the working unit. According to this aspect, since the frame is not positioned immediately above the working unit, the upper portion of the working unit is easily exposed to the outside. Accordingly, since the frame does not hinder when the maintenance of the working unit is performed or when various operations of the working unit are performed, the maintainability of the working unit and the operability of various operations of the working unit are improved.

The driving device may include driving parts that are provided at the pair of steered wheels respectively, and the driving parts may be disposed within the inner peripheries of the pair of steered wheels respectively. According to this aspect, the driving parts are provided on the steered wheels respectively. Accordingly, it is possible to independently control the drive of the respective steered wheels. Moreover, since the driving parts are disposed within the inner peripheries of the steered wheels respectively, a complex power transmission path between the driving part and each steered wheel becomes unnecessary. Accordingly, it is possible to simplify the structure of the steering drive device and to contribute to the reduction of the size of the steering drive device.

The contents of a work of the working unit are not particularly limited. For example, as the working unit, a cleaning unit for cleaning the floor or the road surface or a snow plow unit for clearing snow may be mounted on the working vehicle according to the aspect of the invention. Further, a lawn mowing unit, which is disposed on a vehicle body in front of the pair of steered wheels, may be provided as the working unit. Furthermore, the lawn mowing unit may include a pair of rotating bodies, which is disposed adjacent to each other in the vehicle width direction and of which the lengths in the vehicle width direction are larger than the diameters, as the non-steered wheels, and a cutting blade unit that is provided in front of the pair of rotating bodies and mows lawn. According to this aspect, when lawn mowing is to be performed by the reciprocation of the working vehicle on the lawn surface having a certain area like when the lawn of the green of a golf course is to be mowed, the lawn mowing ranges of the working vehicle generally overlap each other during the reciprocation of the working vehicle in order to prevent the lawn from being not mowed. According to the working vehicle of this aspect, since the working vehicle can turn about one arbitrary point on the pair of rotating bodies at an angle of 180°, an overlap between the lawn mowing ranges can be set simultaneously with the completion of the turning. For this reason, an operation for setting an overlap does not need to be particularly performed after turning. Accordingly, it is possible to perform efficient lawn mowing.

When a lawn mowing unit is mounted as the working unit, a caster angle of the steering device may be set to 0° with respect to each of the pair of steered wheels, a king pin axis of the steering device may be set to be orthogonal to a rotation axis of each of the pair of steered wheels, and the king pin axis of the steering device may be preferably set to a predetermined position that is separated from a middle of the width of each of the pair of steered wheels. In this case, when the working vehicle is steered while being stopped in order to make the working vehicle turn at an angle of 180°, the direction of each steered wheel can be changed during the rolling of each steered wheel. Accordingly, since it is possible to reduce the friction between the lawn surface and the steered wheel, it is possible to suppress damage to the lawn surface.

The predetermined position may be a position on a boundary of a contact area where each of the pair of steered wheels comes into contact with a road surface, or a position close to the boundary. In this case, when the working vehicle is steered while being stopped, it is possible to make the respective steered wheels roll while reducing the friction between the lawn surface and the respective steered wheels as much as possible. For this reason, it is possible to prevent the lawn surface from being damaged by the friction between the lawn surface and the respective steered wheels. In addition, since it is possible to make a distance between the steered wheel and the position of the king pin axis be shorter than when the king pin axis is set to a position separated far from the steered wheel, it is possible to make the radius of rotation of the steered wheel during the change of the direction of the steered wheel be small. Accordingly, it is possible to contribute to the reduction of the size of the steering drive device.

BRIEF DESCRIPTION OF DRAWINGS

FIG. 11A is a view showing the detail of a lifting device and a state where a cutting blade unit is lifted;

FIG. 11B is a view showing the detail of the lifting device and a state where the drum wheels are lifted;

DETAILED DESCRIPTION OF THE INVENTION

Description of Embodiments

Figure 1:
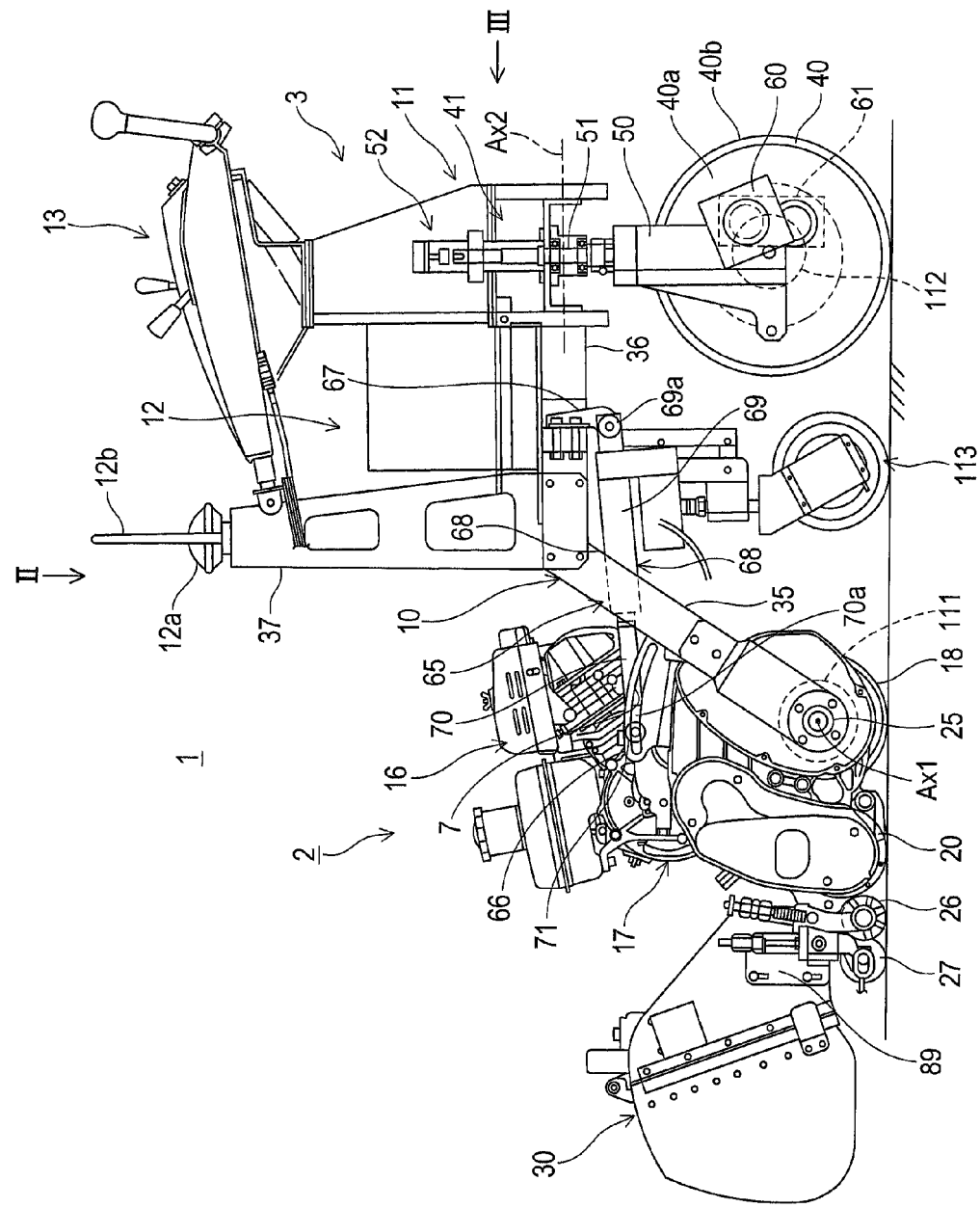
FIG. 1 is a view showing a lawn mowing vehicle according to an embodiment of the invention.
Figure 2:
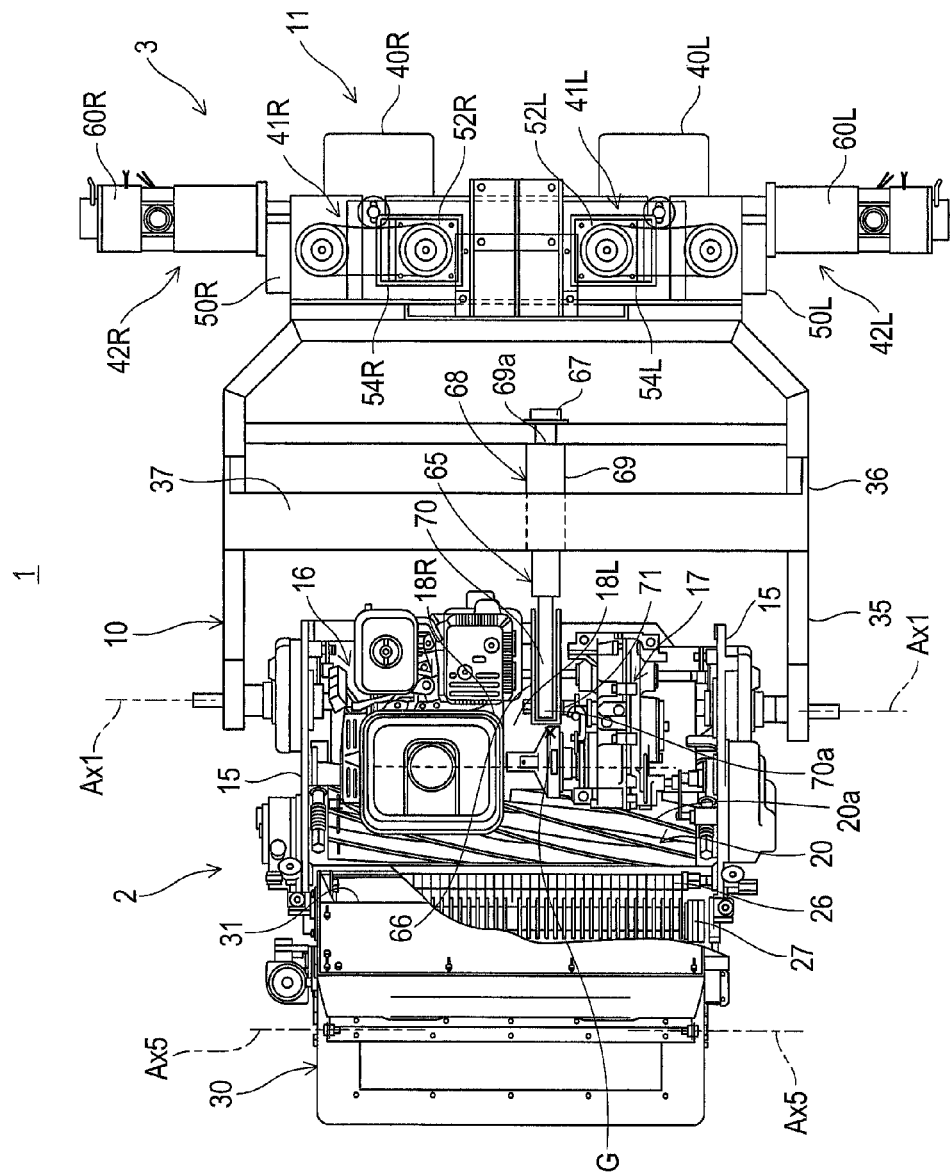
FIG. 2 is a view showing the lawn mowing vehicle of FIG. 1 as seen in the direction of an arrow II.
Figure 3:
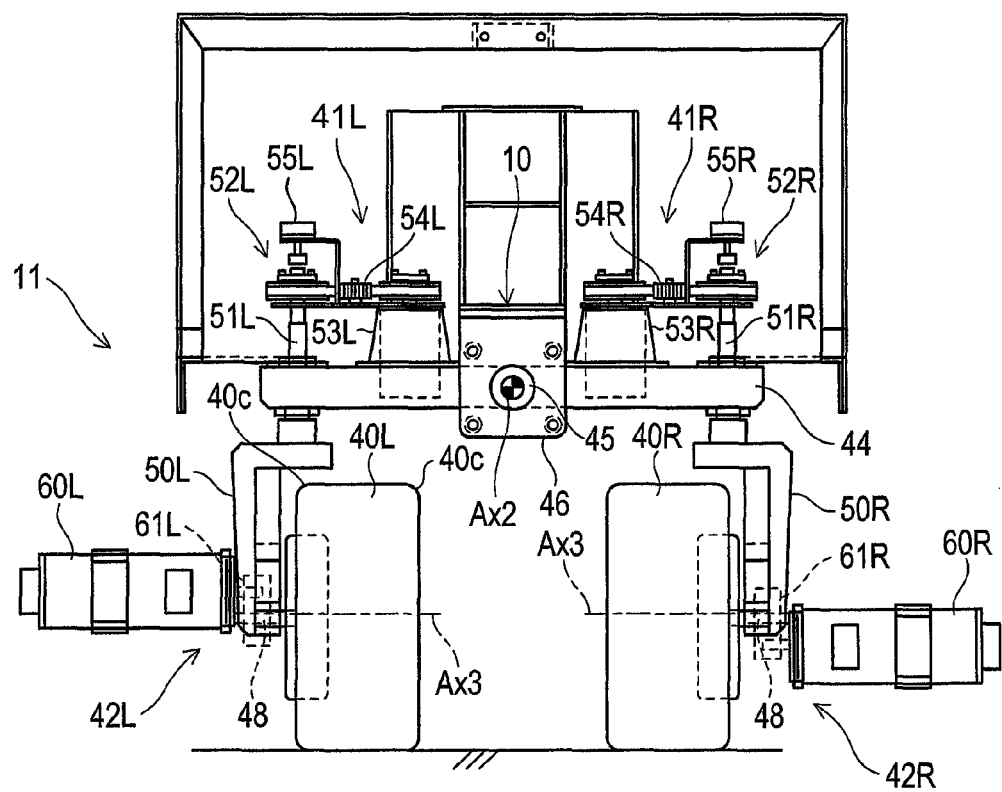
FIG. 3 is a view showing the lawn mowing vehicle of FIG. 1 as seen in the direction of an arrow III.

As shown in FIGS. 1 to 3, a lawn mowing vehicle 1 includes a lawn mowing unit 2 as a working unit and a main body 3 that can travel together with the lawn mowing unit 2. A longitudinal direction of a vehicle body of the lawn mowing vehicle 1 corresponds to a lateral direction of FIG. 1, a vertical direction of the vehicle body corresponds to a vertical direction of FIG. 1, and a vehicle width direction or a lateral direction corresponds to a vertical direction of FIG. 2. L and R may be added to reference numerals for the distinction of the left and right of the respective parts of the lawn mowing vehicle 1. The operating mode of the lawn mowing vehicle 1 may be switched among a radio control mode, a manual control mode, and an autonomous traveling mode. A user may use the lawn mowing vehicle 1 by selecting one mode from these modes according to use. The lawn mowing unit 2 is formed on the basis of a reel type mower that performs lawn mowing. The main body 3 includes a frame 10 that is connected to the lawn mowing unit 2, a steering drive device 11 that is provided in the frame 10, an electrical unit 12 that includes various electronic devices or peripheral devices, and an operating unit 13 that is used to operate the lawn mowing vehicle 1. Meanwhile, for convenience, the electrical unit 12 is not shown in each of the drawings specifically and in detail. Further, the operating unit 13 is not shown in FIGS. 2 and 3.

The lawn mowing unit 2 includes a base 15 (see FIG. 2), and various devices for performing lawn mowing is provided on the base 15. The lawn mowing unit 2 includes an engine 16 that is mounted on the base 15, and a transmission 17 that changes the output of the engine 16 and transmits the output to the respective portions. Power output from the transmission 17 is transmitted to left and right drum wheels 18L and 18R and is transmitted to a cylindrical cutting blade unit 20. The cutting blade unit 20 is formed by mounting plural spiral cutting blades 20a on a cylindrical frame.

Figure 4:
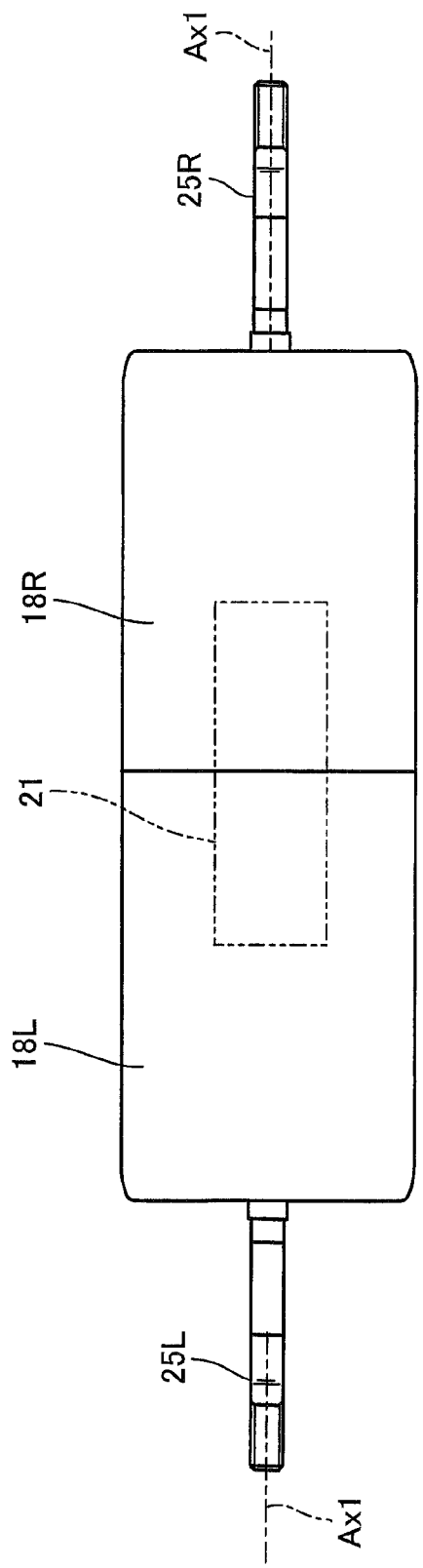
FIG. 4 is a cross-sectional view of a drum wheel.

As shown in FIG. 4, the drum wheels 18L and 18R are formed of non-steered wheels that are driven so as to rotate about an axis Ax1 extending in the vehicle width direction as a rotational center. The drum wheels 18L and 18R are formed so that the length of each of the drum wheels 18L and 18R in the vehicle width direction is larger than the diameter of each of the drum wheels 18L and 18R. Accordingly, it is possible to reduce damage to a lawn surface by reducing the contact pressure on the lawn surface. The drum wheels 18L and 18R are disposed adjacent to each other in the vehicle width direction, and are connected to each other by a connecting mechanism 21 so as to rotate relative to each other. The drum wheels 18L and 18R include axles 25L and 25R that protrude in the vehicle width direction. A differential mechanism (not shown) is provided on a power transmission path between the transmission 17 and the axles 25L and 25R. The drum wheels 18L and 18R can be differentially rotated by the differential mechanism. The pair of drum wheels 18L and 18R corresponds to a pair of rotating bodies.

A thatching roller 26 and a smoothing roller 27 are disposed in front of the drum wheels 18L and 18R. The thatching roller 26 removes clippings that are caught by the lawn. Since the smoothing roller 27 is mounted on the base 15 so as to be capable of being lifted and lowered, the length of the lawn cut by the cutting blade unit 20 can be adjusted by the smoothing roller 27. Grass clippings, which are cut by the cutting blade unit 20, are collected by a collecting-discharging device 30, which is provided at the front end portion of the lawn mowing unit 2, after being guided forward by a cover (not shown). An inlet 31 through which grass clippings flow into the collecting-discharging device is formed at the collecting-discharging device 30.

As shown in FIGS. 1 and 2, the frame 10 is rotatably mounted on the axles 25 of the drum wheels 18. Accordingly, the frame 10 is connected to the working unit 2 so as to be rotatable about the axis Ax1 and immovable in the direction of the axis Ax1. Therefore, the frame 10 is rotated relative to the lawn mowing unit 2 about the axis Ax1, so that it is possible to absorb the unevenness of the road surface in the longitudinal direction of a vehicle body. For this reason, the road surface following property of the lawn mowing vehicle 1 is improved. The frame 10 includes inclined portions 35 that extend obliquely upward from positions where the inclined portions are connected to the lawn mowing unit 2, and horizontal portions 36 that extend from the inclined portions 35 in the lateral direction. Since the frame 10 includes the inclined portions 35, a structure such as the frame 10 is not positioned immediately above the lawn mowing unit 2. For this reason, the upper portion of the lawn mowing unit 2 is easily exposed to the outside, and the frame 10 does not hinder when the maintenance of the lawn mowing unit 2 is performed or when various operations of the lawn mowing unit 2 are performed. Accordingly, the maintainability of the lawn mowing unit and the operability of various operations of the lawn mowing unit are improved. The electrical unit 12 and the operating unit 13 are disposed on the horizontal portions 36. A rack section 37 is mounted on the front ends of the horizontal portions 36. A GPS antenna 12a and a radio antenna 12b of the electrical unit 12 are respectively mounted on the upper portion of the rack section 37. Further, a headlight and an organism detecting sensor (not shown) are mounted on the upper portion of the rack section 37.

The steering drive device 11 includes a pair of steered wheels 40L and 40R that is disposed in the vehicle width direction, steering units 41L and 41R that are used to independently steer the respective steered wheels 40L and 40R, and wheel driving units 42L and 42R that drive the respective steered wheels 40L and 40R. A pair of left and right components of the steering drive device 11 has symmetrical structure. A set of the left and right steering units 41L and 41R corresponds to steering device, and a set of the left and right wheel driving units 42L and 42R corresponds to the driving device. Each of the steered wheels 40 is formed by baking synthetic rubber 40b on the outer peripheral surface of a cylindrical main body 40a. Corners of the respective steered wheels 40 are chamfered, so that shoulder portions 40c are formed at the respective steered wheels 40. The steered wheels 40L and 40R are mounted on a rocking member 44 with the steering units 41L and 41R interposed therebetween.

As shown in FIGS. 1 and 3, the rocking member 44 is a member that extends in the vehicle width direction. The rocking member 44 is connected to the frame 10 so as to be capable of rocking about an oscillation axis Ax2 that passes through the center of the rocking member and extends in the longitudinal direction of the vehicle body. Accordingly, since the rocking member 44 can absorb the unevenness or inclination of the road surface in the vehicle width direction by rocking, the road surface following property of the lawn mowing vehicle 1 is improved. Specifically, a rocking shaft 45, which passes through the center of the rocking member 44, is mounted on a bracket 46 that is fixed to the frame 10 through a bearing (not shown). Accordingly, the rocking member 44 is connected to the frame 10. The steering units 41L and 41R are mounted so as to be symmetric with respect to the middle portion of the rocking member 44.

Figure 5:
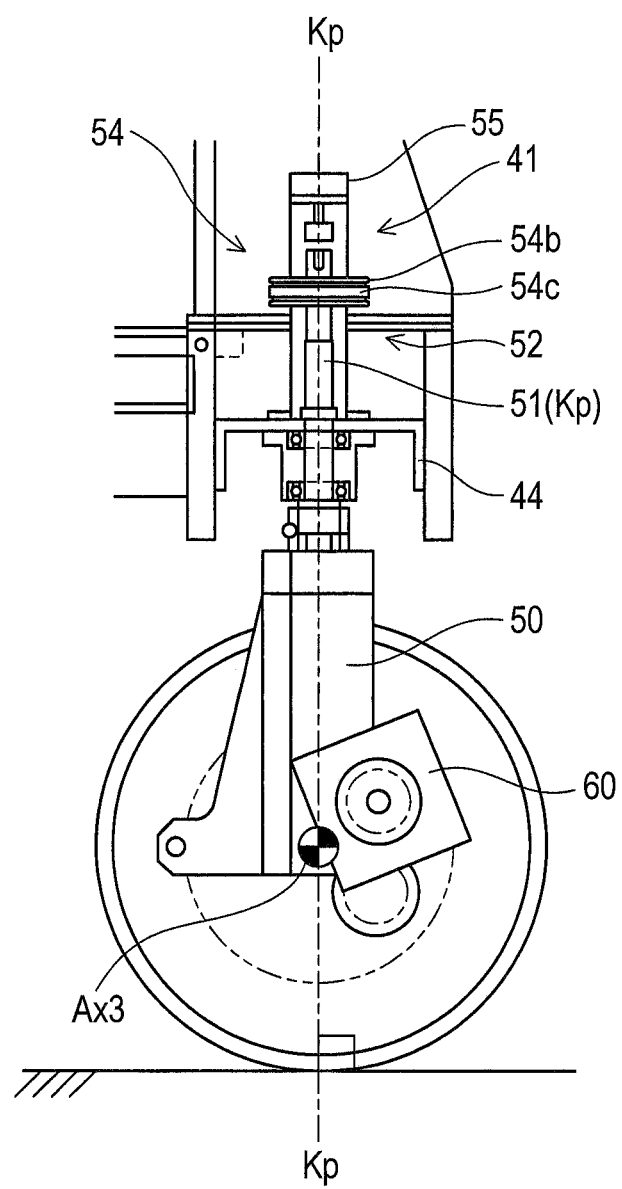
FIG. 5 is an enlarged view of a steering unit as seen in a vehicle width direction.
Figure 6:
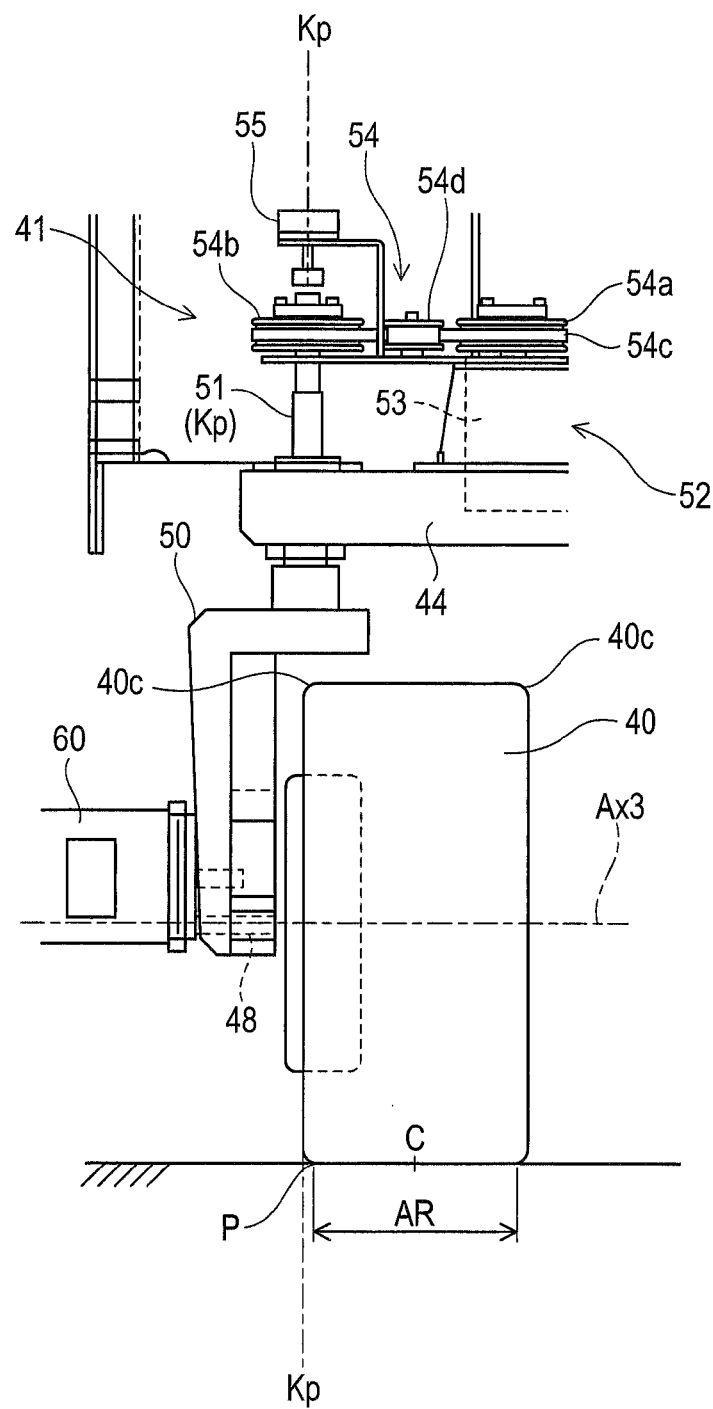
FIG. 6 is an enlarged view of the steering unit as seen from the rear side of a vehicle body.

Each of the steering units 41 includes a hub carrier 50, a turning shaft 51, and a steering mechanism 52. The hub carrier 50 supports the steered wheel 40 so that the steered wheel 40 can rotate about a rotation axis Ax3 passing through the center of an axle 48. One end of the turning shaft 51 is fixed to the hub carrier 50, and the other end of the turning shaft 51 extends upward and is rotationally provided at the rocking member 44. The steering mechanism 52 rotationally drives the turning shaft 51. The steering mechanism 52 includes an electric motor 53 that is a drive source, a transmission mechanism 54 that transfers the rotational power of the electric motor 53 to the turning shaft 51, and a rotation angle sensor 55 that detects the rotation angle of the turning shaft 51, that is, the steering angle of the steered wheel 40. As shown in FIGS. 5 and 6, the transmission mechanism 54 includes a driving pulley 54a that is connected to the electric motor 53, a driven pulley 54b that is connected to the end portion of the turning shaft 51, a belt 54c that is stretched by the driving pulley 54a and the driven pulley 54b, and a tension pulley 54d that adjusts the tension of the belt 54c. Each of the driving pulley 54a and the driven pulley 54b is a toothed pulley, and the belt 54c is a toothed belt that meshes with the respective pulleys 54a and 54b.

As shown in FIGS. 5 and 6, the turning shaft 51 of the steering unit 41 corresponds to a king pin axis Kp. Further, a caster angle is 0°, and the king pin axis Kp is orthogonal to the rotation axis Ax3. When a caster angle is 0°, it is possible to reduce the frictional resistance between the lawn surface and the steered wheel 40 during steering as compared to other cases. Accordingly, it is possible to suppress damage to the lawn surface. Further, since the king pin axis Kp is orthogonal to the rotation axis Ax3, the friction range between the lawn surface and the steered wheel 40 when the lawn mowing vehicle 1 is steered while being stopped may be made smaller than when the king pin axis Kp is set to a position separated from the rotation axis Ax3, for example, when the king pin axis Kp is set to a position separated forward or rearward from the rotation axis Ax3.

Further, as shown in FIG. 6, a king pin axis Kp of the steering unit 41 is set to a position that is separated from the middle C of the width of the steered wheel 40. In this embodiment, the king pin axis Kp is set to the end of the steered wheel 40 in the width direction of the steered wheel 40 that is close to a boundary P of a contact area AR where the steered wheel 40 comes into contact with a flat road surface. Since the king pin axis Kp is set to this position, the direction of the steered wheel 40 can be changed during the rolling of the steered wheel when the lawn mowing vehicle 1 is steered while being stopped. Accordingly, it is possible to reduce the friction between the lawn surface and the steered wheel as much as possible. In addition, since it is possible to make a distance between the steered wheel 40 and the position of the king pin axis Kp be shorter than when the king pin axis Kp is set to the position separated far from the steered wheel 40, it is possible to make the radius of rotation of the steered wheel 40 during the change of the direction of the steered wheel be small. Accordingly, it is possible to contribute to the reduction of the size of the steering drive device 11. Even when the position of the king pin axis Kp is set to the boundary P, it is possible to obtain substantially the same effect as described above.

As shown in FIG. 3, each of the wheel driving units 42 includes an electric motor 60 that is mounted on the hub carrier 50, and a reduction gear 61 that reduces the speed of the rotation of the electric motor 60 and transmits the rotation to the axle 48 of the steered wheel 40. The electric motor 60 and the reduction gear 61 are within the inner periphery of the steered wheel 40 without protruding to the outside of the steered wheel 40 in the radial direction of the steered wheel. That is, each of the wheel driving units 42 is disposed within the inner periphery of the steered wheel 40. For this reason, since the complex power transmission path between each of the wheel driving units 42 and the steered wheel 40 becomes unnecessary, it is possible to simplify the structure of the steering drive device and to contribute to the reduction of the size of the steering drive device.

Figure 7:
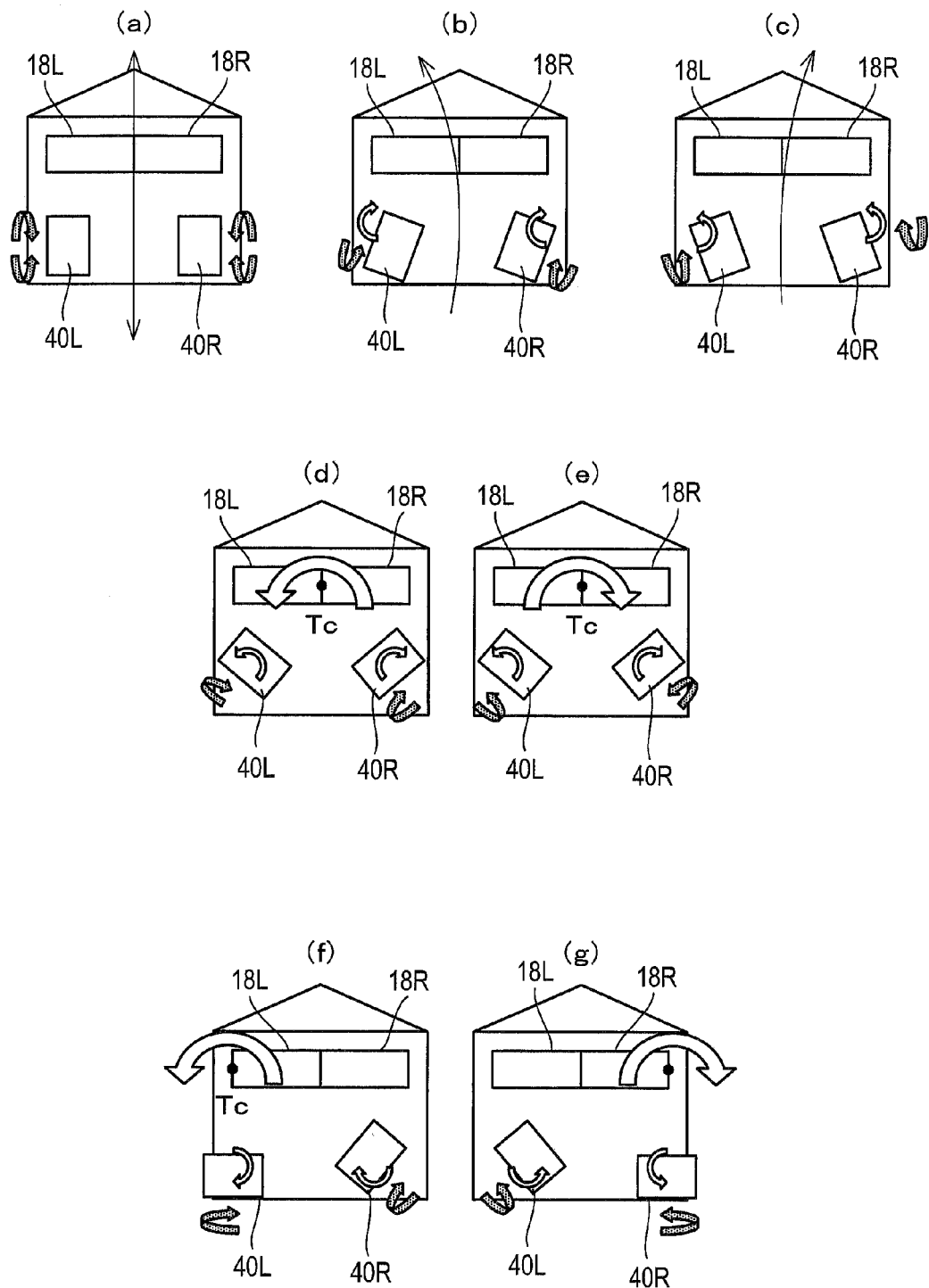
FIG. 7 is a view showing the traveling and turning patterns of the lawn mowing vehicle.

As described above, the lawn mowing vehicle 1 includes the steering drive device 11 that can independently steer and drive the pair of steered wheels 40L and 40R. Accordingly, the lawn mowing vehicle 1 can travel and turn so as to be suitable for lawn mowing. As shown in FIG. 7, it is possible to allow the working vehicle to travel in the same manner as the manner of a working vehicle in the related art by appropriately setting the steering angle and rotational driving direction of each of the steered wheels 40L and 40R. That is, the lawn mowing vehicle 1 can respectively perform (a) straight traveling, (b) left turn-traveling, and (c) right turn-traveling. Further, when the lawn mowing vehicle 1 is made to turn while being stopped, the rotation axes of the respective steered wheels 40L and 40R cross each other and the lawn mowing vehicle can turn about one arbitrary point positioned on the pair of drum wheels 18L and 18R. For example, the lawn mowing vehicle 1 can respectively perform (d) counterclockwise pivot turn about a boundary line between the pair of drum wheels 18L and 18R as a turning center Tc, (e) clockwise pivot turn about a boundary line between the pair of drum wheels 18L and 18R as a turning center Tc, (f) counterclockwise pivot turn about a left end portion of the left drum wheel 18L as a turning center Tc, and (g) clockwise pivot turn about a right end portion of the right drum wheel 18R as a turning center Tc.

Figure 8:
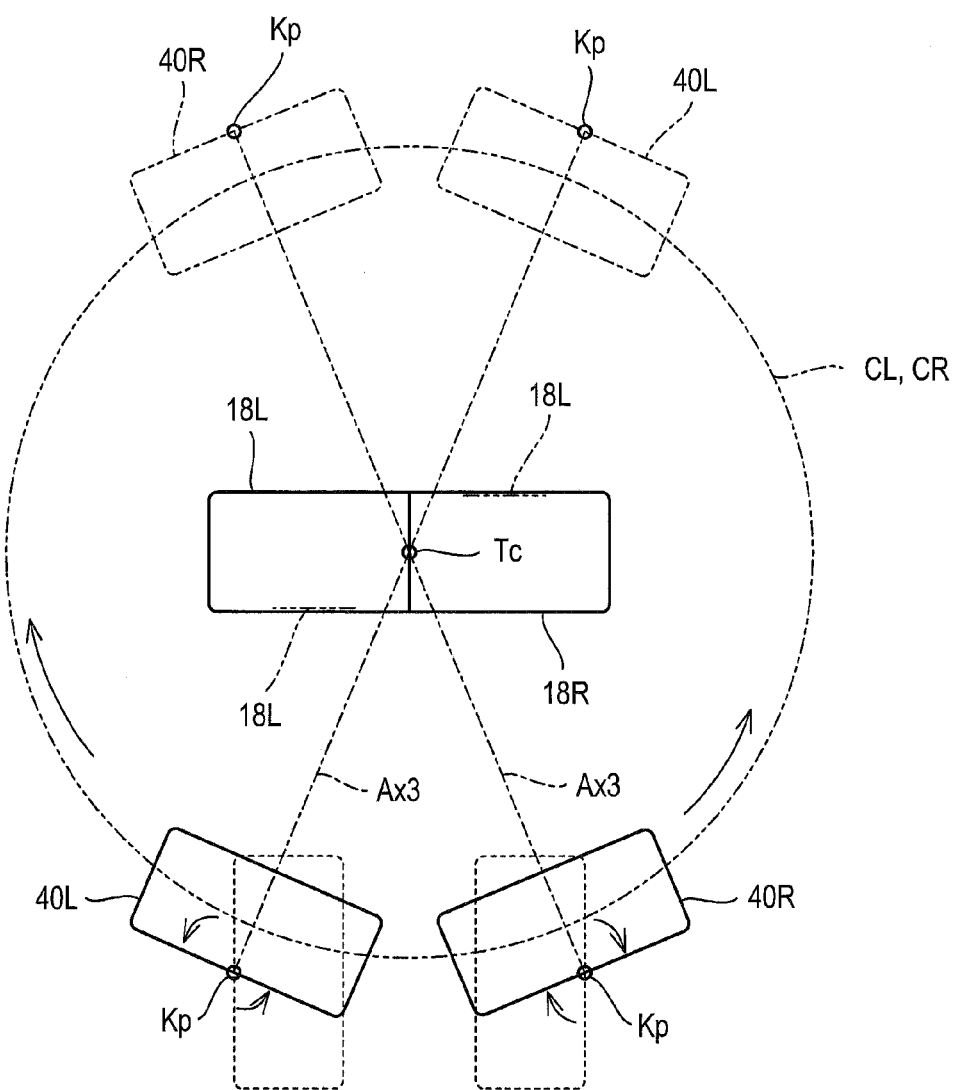
FIG. 8 is a view showing the detail of a first pivot turn.

In the case of the pivot turn of FIGS. 7D and 7E, the position of the lawn mowing vehicle is not shifted in the lateral direction and the lawn mowing vehicle 1 is reversed when the lawn mowing vehicle turns at an angle of 180°. This is referred to as a first pivot turn. As shown in FIG. 8, in the case of the first pivot turn, the lawn mowing vehicle 1 turns about the turning center Tc while the respective steered wheels 40L and 40R travel so that the traces CL and CR correspond to each other. In the case of the first pivot turn, the boundary line between the pair of drum wheels 18L and 18R serves as the turning center Tc. Accordingly, the directions of the pair of drum wheels 18L and 18R are changed before and after turning, but the position of the lawn mowing vehicle is not shifted in the lateral direction.

Figure 9:
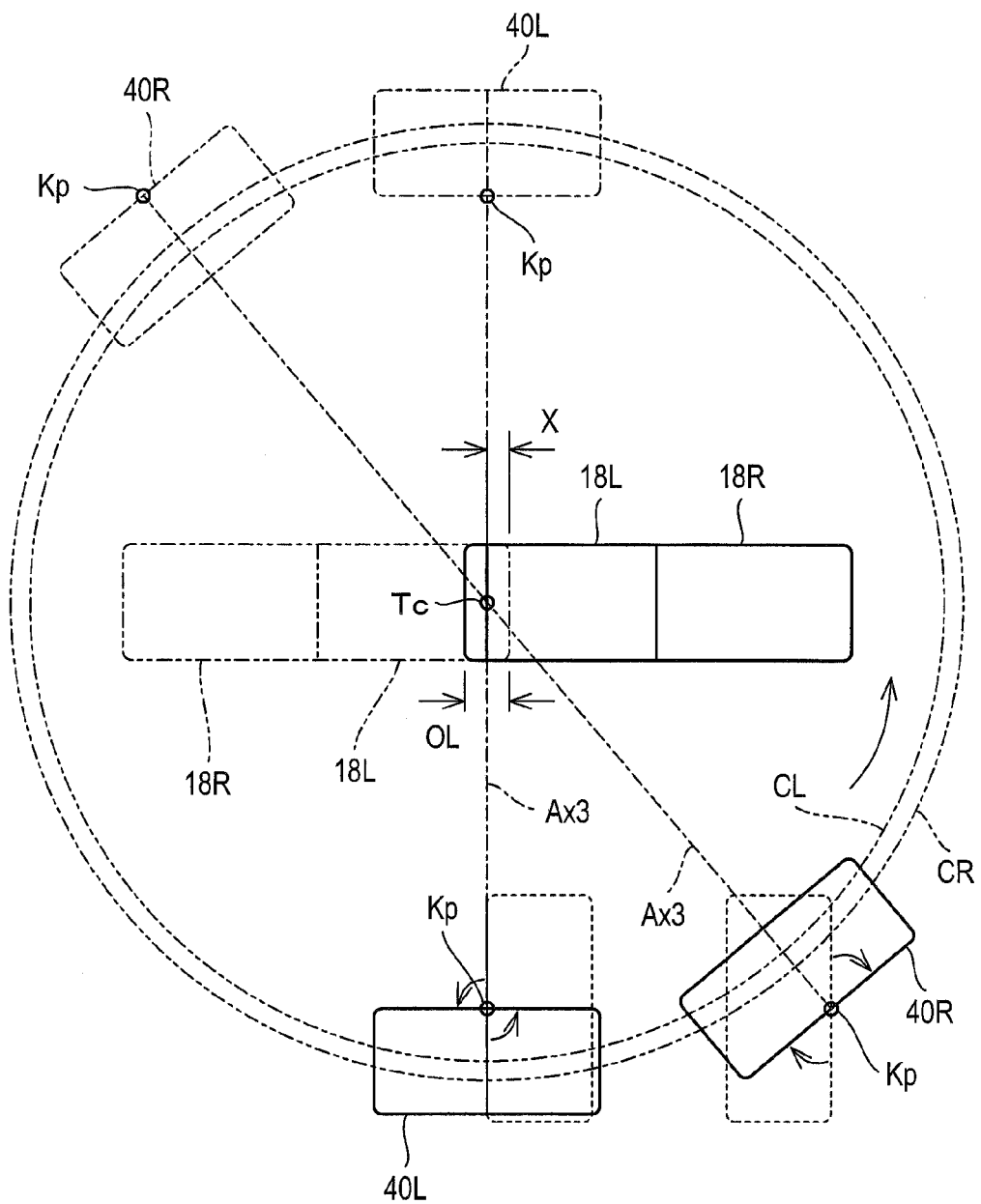
FIG. 9 is a view showing the detail of a counterclockwise first pivot turn.
Figure 10:
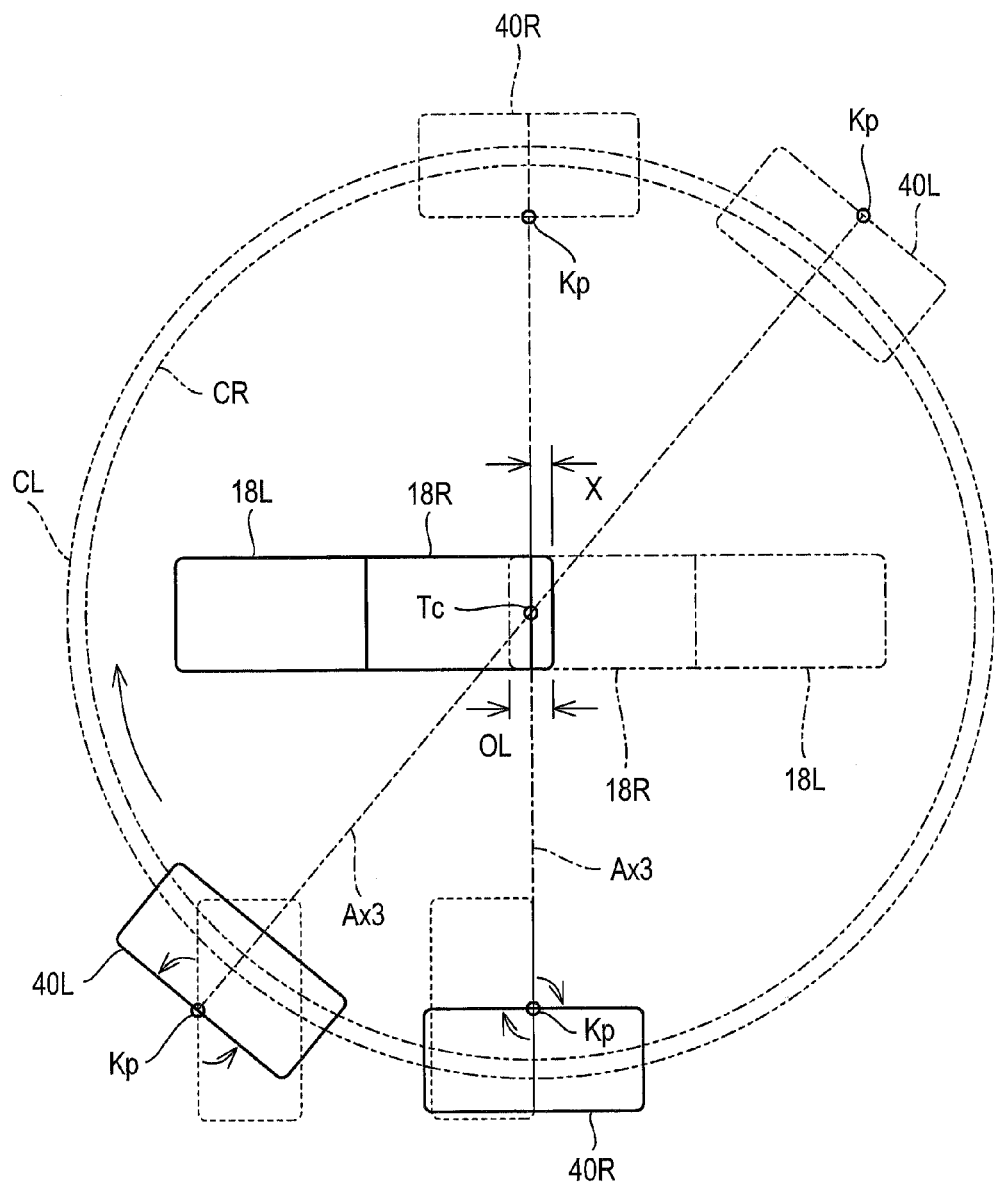
FIG. 10 is a view showing the detail of a clockwise second pivot turn.

Meanwhile, in the case of the pivot turn of FIGS. 7F and 7G, the position of the lawn mowing vehicle is shifted lateral direction and the lawn mowing vehicle 1 is reversed when the lawn mowing vehicle turns at an angle of 180°. This is referred to as a second pivot turn. As shown in FIGS. 9 and 10, in the case of the second pivot turn, the lawn mowing vehicle 1 turns about the turning center Tc while the respective steered wheels 40L and 40R travel along traces CL and CR. In the case of the second pivot turn, the pair of drum wheels 18L and 18R is shifted to the right side or left side before and after turning. When a distance between the end portion of the drum wheel 18 and the turning center Tc is denoted by an offset X as shown in FIGS. 9 and 10, an overlap OL between before and after the turning of the drum wheel 18 is the double of the offset X. Since the width of the cutting blade unit 20 (see FIG. 2) is equal to the total length of the pair of drum wheels 18L and 18R in the axial direction of the drum wheel, the overlap OL of FIG. 9 or 10 is equal to an overlap between lawn mowing ranges of the cutting blade unit 20.

For example, when lawn mowing is to be performed by the reciprocation of the lawn mowing vehicle 1 on the lawn surface having a certain area like when the lawn of the green of a golf course is to be mowed, the lawn mowing ranges of the lawn mowing vehicle generally overlap each other during the reciprocation of the lawn mowing vehicle in order to prevent the lawn from being not mowed. As described above, the offset X is set by the steering angles of the respective steered wheels 40L and 40R and the lawn mowing vehicle 1 can perform the second pivot turn. Accordingly, since the overlap between the lawn mowing ranges can be set simultaneously with the completion of the second pivot turn, an operation for setting an overlap does not need to be particularly performed after turning. Therefore, it is possible to perform efficient lawn mowing.

As shown in FIGS. 1 and 2, the lawn mowing vehicle 1 is provided with a lifting device 65 that lifts and lowers the lawn mowing unit 2. The lifting device 65 includes a first support member 66 that is provided at the lawn mowing unit 2, a second support member 67 that is provided at the frame 10, which is a part of the main body 3, and a linear actuator 68 as a drive mechanism that is provided between the first and second support members 66 and 67. The linear actuator 68 includes a main body part 69 that includes a drive source, and a retractable rod 70 that is assembled with the main body part 69. A front end portion 70a of the retractable rod 70 is linked to the first support member 66, and a rear end portion 69a of the main body part 69 is linked to the second support member 67. The front end portion 70a corresponds to a first end portion, and the rear end portion 69a corresponds to a second end portion. The linear actuator 68 can cause the retractable rod 70 to makes a stroke relative to the main body part 69 in a design range. Accordingly, the linear actuator 68 can change the distance between the front end portion 70a of the retractable rod 70 and the rear end portion 69a of the main body part 69. In this embodiment, a distance between the front end portion 70a of the retractable rod 70 and the rear end portion 69a of the main body part 69, which is based on a state where the smoothing roller 27 and the drum wheels 18 of the lawn mowing unit 2 come into contact with the road surface and the steered wheels 40 come into contact with the road surface, corresponds to a reference distance.

As shown in FIG. 11A, a restricting tool 71, which restricts and releases the connection position of the front end portion 70a of the retractable rod 70, is mounted on the first support member 66. A long hole 72, which is curved upward, is formed at the first support member 66 in order to change the connection position of the front end portion 70a. It is possible to change the connection position of the front end portion 70a of the retractable rod 70 in the range of the long hole 72. In order to adjust this connection position, the restricting tool 71 is brought into a release state first and the connection position is changed along the long hole 72. After that, the state of the restricting tool 71 is switched to a restricted state from the release state at the changed connection position. Accordingly, it is possible to adjust the connection position to a desired position. The combination of the restricting tool 71 and the long hole 72 corresponds to a position adjusting mechanism.

As shown in FIG. 11A, when the retractable rod 70 of the linear actuator 68 retracts to a position shown by a two-dot chain line from a state where the drum wheels 18 and the steered wheels 40 come into contact with the road surface, the lawn mowing unit 2 is lifted while being rotated upward about the axis Ax1 in a state where the drum wheels 18 come into contact with the road surface. Accordingly, since the cutting blade unit 20 floats from the road surface, it is possible to stop lawn mowing. Further, when the retractable rod 70 returns to the original length shown by a solid line from a state where the cutting blade unit 20 floats from the road surface, the cutting blade unit 20 comes into contact with the road surface. Accordingly, it is possible to resume lawn mowing. Furthermore, when the cutting blade unit 20 floats from the lawn surface by the lifting device 65, the cutting blade unit 20 is not dragged while coming into contact with the lawn surface even though the lawn mowing vehicle 1 performs a pivot turn. Therefore, it is possible to prevent the lawn surface from being significantly damaged during the pivot turn of the lawn mowing vehicle 1. Meanwhile, a lift distance h1 of the cutting blade unit 20 can be changed by the adjustment of the connection position of the front end portion 70a or the stroke of the retractable rod 70.

Meanwhile, as shown in FIG. 11B, when the retractable rod 70 of the linear actuator 68 extends in the direction of an arrow from a state where the drum wheels 18 and the steered wheels 40 come into contact with the road surface and the lawn mowing vehicle 1 is stopped, the lawn mowing unit 2 is rotated about the smoothing roller 27 as a fulcrum in the direction opposite to the direction of FIG. 11A. Accordingly, it is possible to make the drum wheels 18 float from the road surface while the smoothing roller 27 and the steered wheels 40 come into contact with the road surface. Since the smoothing roller 27 serves as the fulcrum of the rotation operation of the lawn mowing unit 2, it is possible to prevent the occurrence of a trouble that the lawn mowing unit 2 is bitten into the lawn surface at the time of the floating operation of the drum wheels 18. A lift distance h2 of the drum wheels 18 can be changed by the adjustment of the connection position of the front end portion 70a or the stroke of the retractable rod 70. Meanwhile, if the stroke of the linear actuator 68 is insufficient when a floating operation of the drum wheels 18 shown in FIG. 11B is performed, it is possible to compensate the lack of the stroke by adjusting the connection position of the front end portion 70a of the retractable rod 70 to the rear side of the vehicle body.

The lawn mowing vehicle 1 is adapted so that moving wheels Tw having a diameter larger than the diameter of the drum wheel 18 are detachably mounted on the axles 25. Since the lifting device 65 can make the drum wheel 18 float, it is not necessary to jack up the lawn mowing unit 2 by a device such as a hydraulic jack when the moving wheels Tw are mounted or detached. Accordingly, the practicality of the lawn mowing vehicle 1 is improved. Further, it is possible to change the respective lift distances h1 and h2 relative to the stroke of the linear actuator 68 by adjusting the connection position of the front end portion 70a of the retractable rod 70. Furthermore, it is possible to adjust a load at the time of the operation of the linear actuator 68 by adjusting the connection position of the front end portion 70a of the retractable rod 70.

Figure 12:
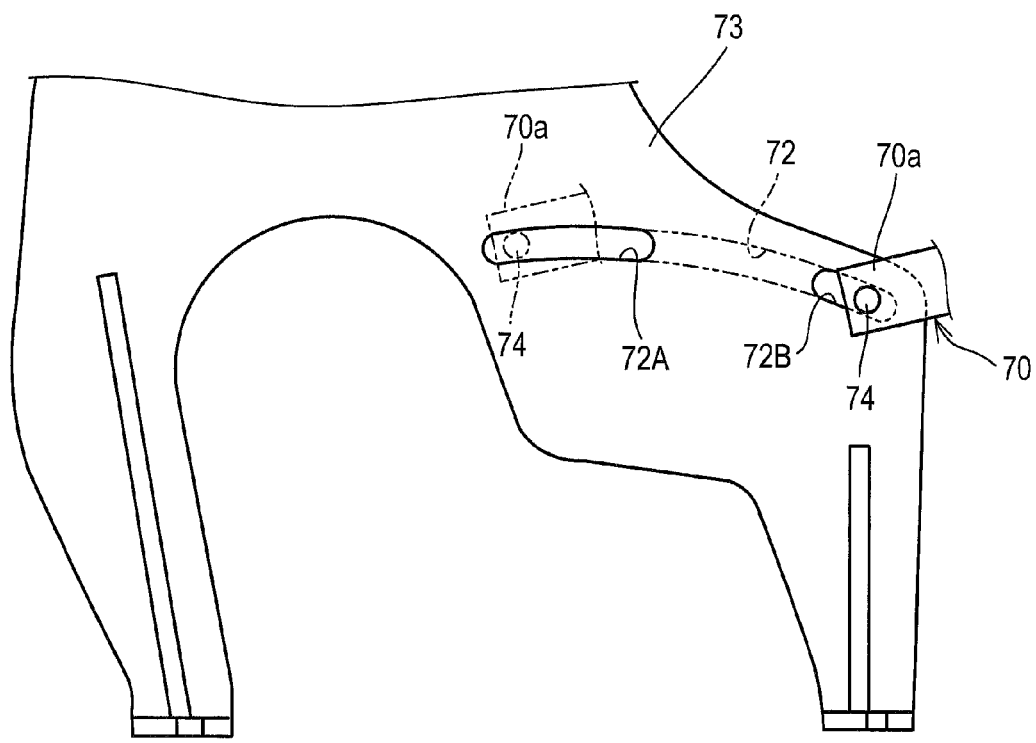
FIG. 12 is a view showing an embodiment that uses a position switching member and a position adjusting pin.

The connection position of the front end portion 70a of the retractable rod 70 may be selectively switched between a position suitable for the aspect of FIG. 11A and a position suitable for the aspect of FIG. 11B. This switching can be achieved by the linkage of a plate-like position switching member 73 and a position adjusting pin 74 shown in FIG. 12. The position switching member 73 is mounted on the lawn mowing unit 2 so as to be positioned on the opposite side of the first support member 66 with the retractable rod 70 interposed between the position switching member 73 and the first support member 66. Two long holes 72A and 72B, which overlap the long hole 72 formed at the first support member 66, are formed at the position switching member 73. The long hole 72A is disposed on the front side of the vehicle body and at a position suitable at the time of the lifting and lowering of the cutting blade unit 20 shown in FIG. 11A. The long hole 72B is disposed on the rear side of the vehicle body and at a position suitable at the time of the floating operation of the drum wheels 18 shown in FIG. 11B. The position adjusting pin 74 can be pulled out from or inserted into the long holes 72A and 72B while passing through the front end portion 70a of the retractable rod 70. Accordingly, when the cutting blade unit 20 is to be lifted and lowered (see FIG. 11A), the position adjusting pin 74 is inserted into the long hole 72A. Therefore, the front end portion 70a of the retractable rod 70 is positioned in the range of the long hole 72A and the position adjusting pin 74 serves as a point of application, so that the cutting blade unit 20 can be lifted and lowered. Meanwhile, when the drum wheels 18 are made to float (see FIG. 11B), the position adjusting pin 74 is pulled out from the long hole 72A and inserted into the long hole 72B. Accordingly, the front end portion 70a of the retractable rod 70 is positioned in the range of the long hole 72B and the position adjusting pin 74 serves as a point of application, so that the drum wheels 18 can float. In this embodiment, the combination of the position adjusting pin 74 and the respective long holes 72A and 72B of the position switching member 73 corresponds to a position adjusting mechanism. Meanwhile, while the position adjusting pin 74 is inserted into the long hole 72A or 72B, it is possible to finely adjust the connection position of the front end portion 70a by the restricting tool 71. Further, it is possible to remove an allowance between the position adjusting pin 74 and the long hole 72A or 72B.

As shown in FIG. 2, the center of gravity G of the lawn mowing unit 2 is positioned on the left side of the middle of the lawn mowing unit. That is, the weight distribution of the lawn mowing unit 2 is biased to the left side of the middle of the lawn mowing unit in the direction of the axis Ax1. The respective first and second support members 66 and 67 of the lifting device 65 are positioned on the left side to which the weight distribution is biased, and are in line in the longitudinal direction of the vehicle body. For this reason, while the lawn mowing unit 2 is lifted and lowered by the lifting device 65, the balance of the lawn mowing vehicle in the vehicle width direction is not easily lost. Accordingly, the lifting and lowering operations of the lawn mowing unit 2 are stable. Meanwhile, the respective support members 66 and 67 may be disposed on a straight line that crosses the center of gravity line and extends in the longitudinal direction of the vehicle body. In this case, while the cutting blade unit is lifted and lowered, the working unit 2 is completely balanced in the vehicle width direction. Accordingly, the stability of the lifting and lowering operations of the working unit 2 is further improved.

Figure 13:
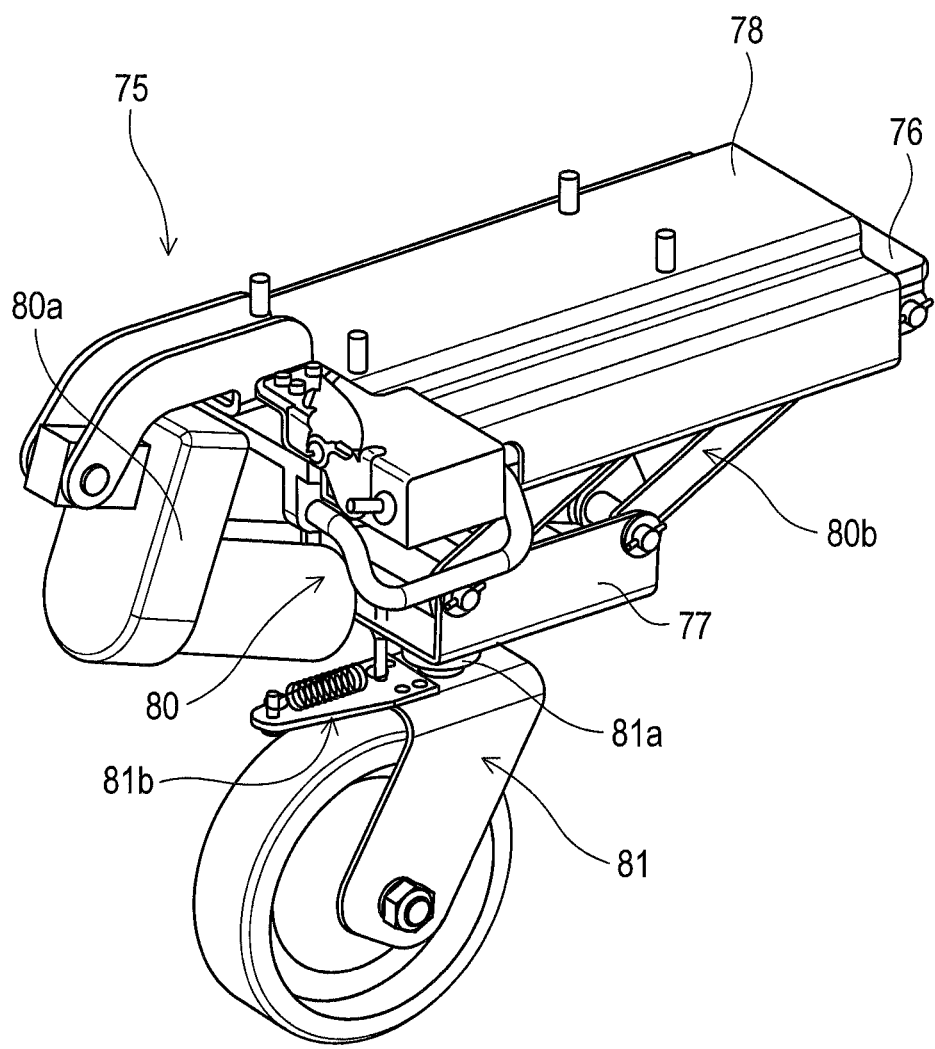
FIG. 13 is a perspective view of a jack device that is in an initial state.
Figure 14:
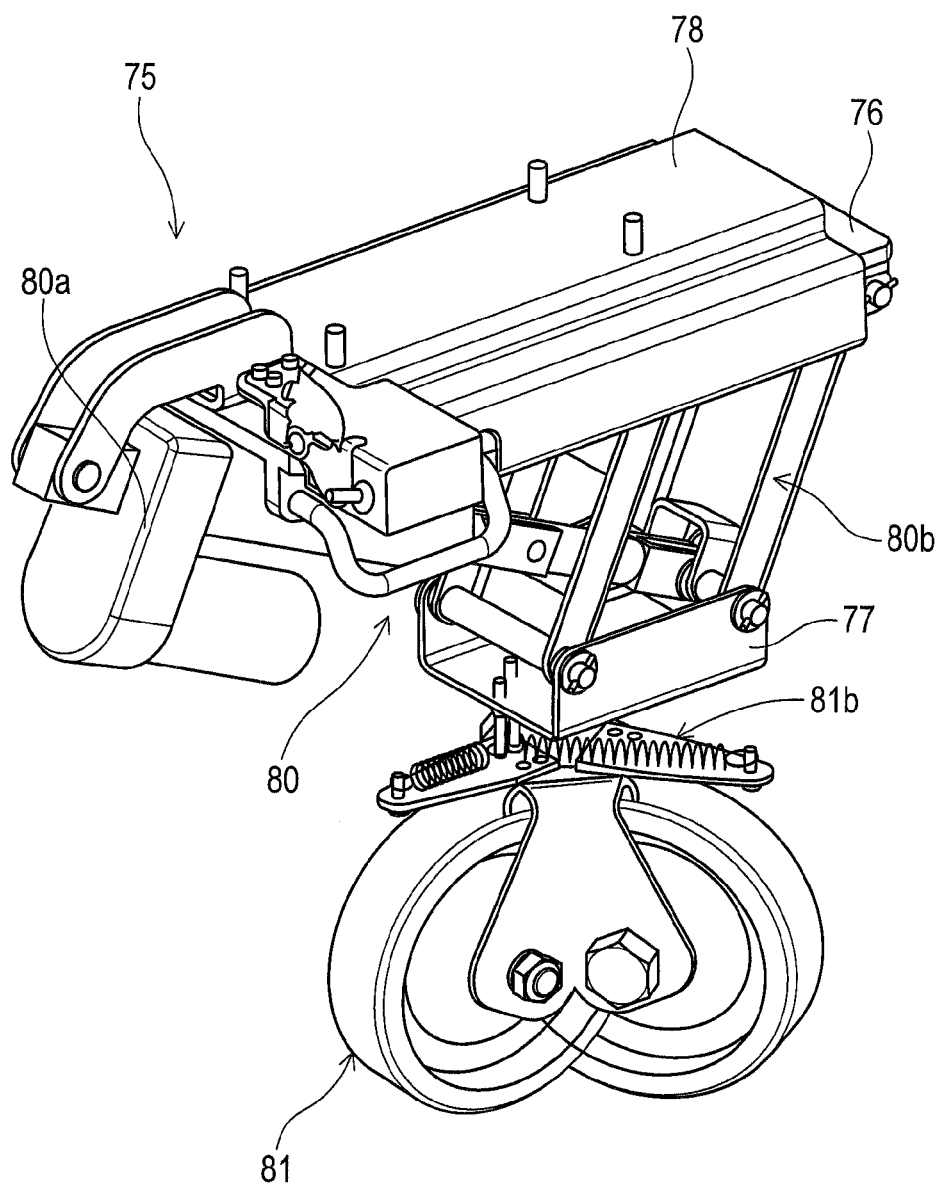
FIG. 14 is a perspective view of the jack device that is in a lifted state.
Figure 15:
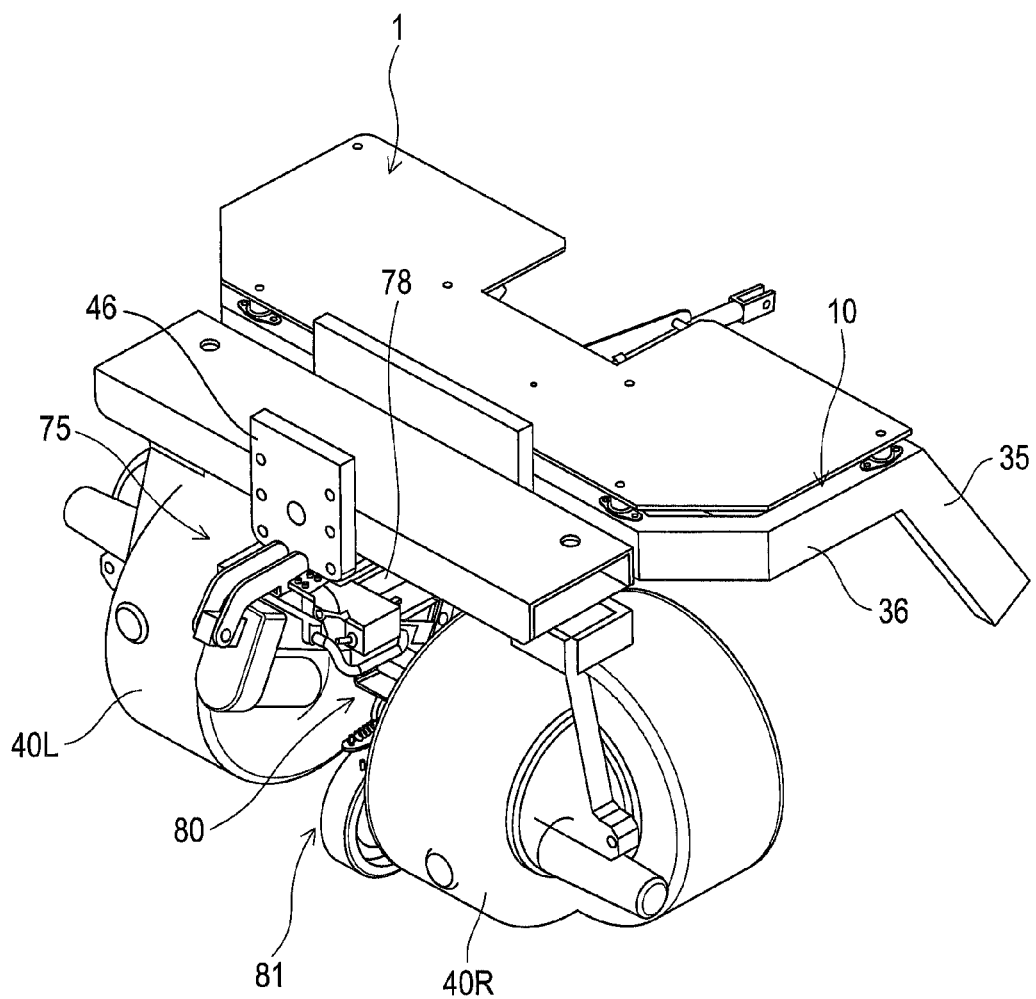
FIG. 15 is a perspective view showing a state where the jack device is mounted on the lawn mowing vehicle.

A jack device 75, which is used to make the steered wheels 40 float from the road surface, may be detachably mounted on the lawn mowing vehicle 1 as shown in FIGS. 13 to 15. The jack device 75 includes a slide base 76 and a lower base 77 that is disposed parallel to the slide base 76. The slide base 76 is mounted on a holder device 78 of the lawn mowing vehicle 1 while sliding on the holder device 78, so that the jack device 75 is mounted on the lawn mowing vehicle 1 (see FIG. 15). The holder device 78 is disposed between the left and right steered wheels 40L and 40R, and is fixed to each of the horizontal portion 36 of the frame 10 so that a sliding direction corresponds to the longitudinal direction of the vehicle body. When the jack device 75 is mounted, the holder device 78 may mesh with the slide base 76 so as to be capable of restricting the movement of the slide base in the vehicle width direction and the vertical direction.

The jack device 75 further includes a jack mechanism unit 80 and a caster unit 81. The jack mechanism unit 80 can change a gap between the slide base 76 and the lower base 77 to a state of FIG. 14 from a state of FIG. 13 while maintaining the slide base 76 and the lower base 77 parallel to each other. The caster unit 81 is provided on the lower base 77. The jack mechanism unit 80 is a well-known mechanism that moves up and down a link mechanism 80b interposed between the slide base 76 and the lower base 77 by using the power of a driving motor 80a. The caster unit 81 includes a turning shaft 81a and a return mechanism 81b. The turning shaft 81a extends in the vertical direction and is rotatably mounted on the lower base 77. The return mechanism 81b makes the caster unit return to a reference position, which corresponds to a straight-traveling state, from a state, where the direction of the caster unit has been changed as shown in FIG. 14, by using a spring force.

After the jack device 75, which is in an initial state shown in FIG. 13, is mounted on the lawn mowing vehicle 1, the state of the jack device is changed to a lifted state shown in FIG. 14 through the operation of the jack mechanism unit 80. Accordingly, it is possible to make the respective steered wheels 40L and 40R float from the road surface as shown in FIG. 15. When the respective steered wheels 40L and 40R are jacked up by the jack device 75 while the above-mentioned moving wheels Tw (see FIG. 11B) are mounted, the lawn mowing vehicle 1 is supported by the left and right moving wheels Tw and the caster unit 81. Accordingly, it is possible to naturally move the lawn mowing vehicle 1 by human power or the drive power of the engine 16 that is output to the moving wheels Tw.

As shown in FIG. 1, the lawn mowing vehicle 1 is provided with front-wheel encoders 111, rear-wheel encoders 112, and a free encoder 113, which is positioned between the front-wheel encoder 111 and the rear-wheel encoder 112, in order to detect its own traveling state. The front-wheel encoders 111 are provided on the left and right drum wheels 18L and 18R respectively, and the rear-wheel encoders 112 are provided on the left and right steered wheels 40L and 40R respectively. One free encoder 113 is provided in the middle of the lawn mowing vehicle in the vehicle width direction.

As described above, the drum wheels 18L and 18R are differentially rotated and generate drive torque respectively. It is possible to detect differential rotation or skidding of the respective wheels by using the front-wheel encoders 111. Accordingly, it is possible to improve the accuracy in control of the drive of the drum wheels 18L and 18R, and to obtain the timing when the pair of steered wheels 40L and 40R is driven. Since the pair of steered wheels 40L and 40R can be independently driven, the differential rotation or skidding occurs during the forward and backward movement or turning of the lawn mowing vehicle 1. It is possible to detect differential rotation or skidding of the respective wheels by using the rear-wheel encoders 112. Accordingly, it is possible to control the drive of the respective steered wheels 40L and 40R so that the lawn mowing vehicle 1 exactly corresponds to a predetermined trace.

Figure 16:
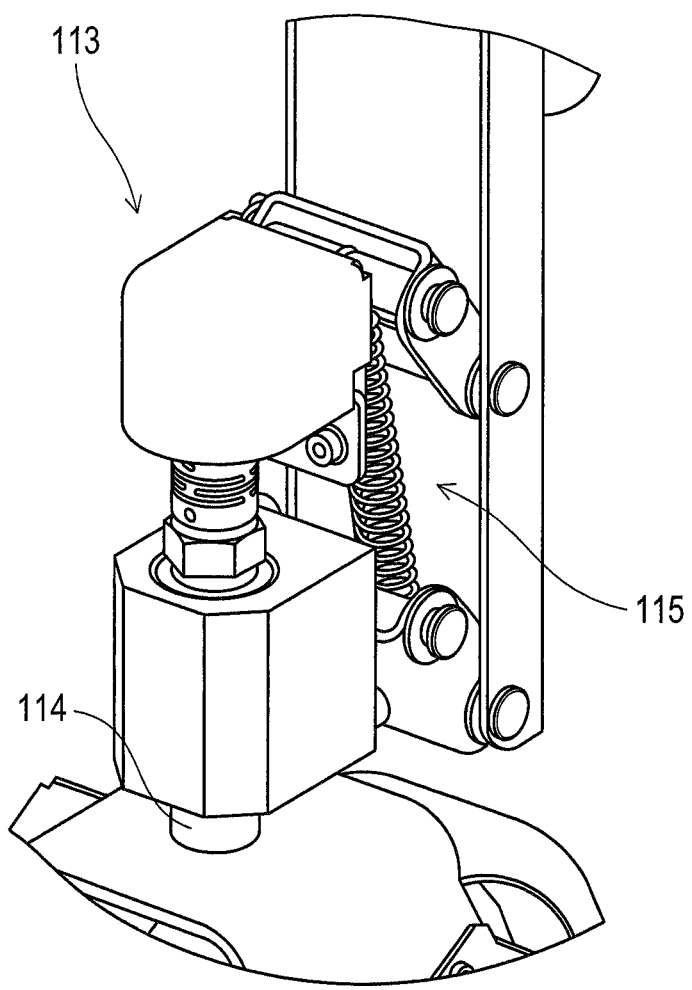
FIG. 16 is a perspective view showing a part of a free encoder.
Figure 17:
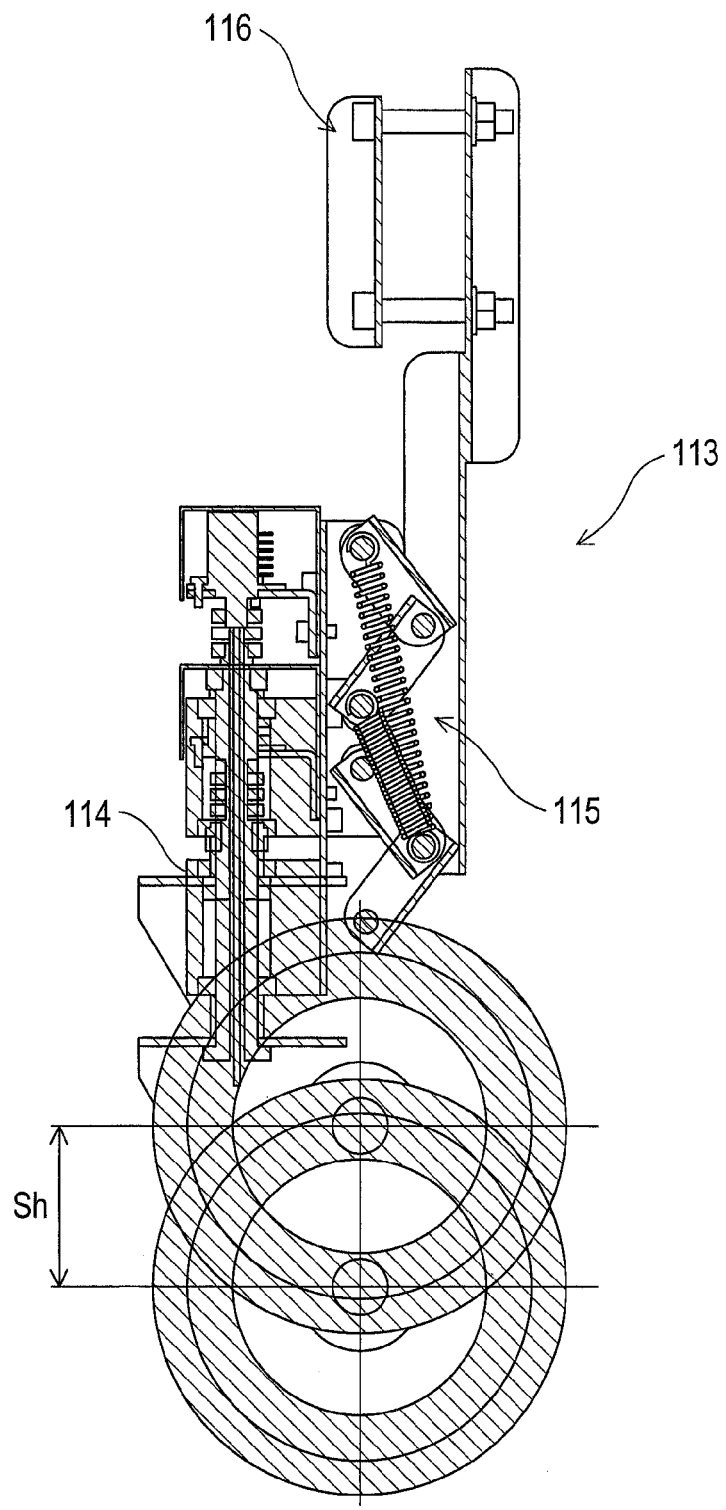
FIG. 17 is a cross-sectional view showing the mechanical operation of the free encoder.

As shown in FIG. 1, the free encoder 113 has the structure of a caster that can freely rotate without drive power. For this reason, the free encoder can smoothly roll without restriction. As shown in FIGS. 16 and 17, the free encoder 113 includes a turning shaft 114 that extends in the vertical direction and is rotatable, and a suspension 115 that allows a stroke Sh (see FIG. 17) in the vertical direction. For this reason, it is possible to easily follow the change of the traveling direction of the lawn mowing vehicle 1 or the change of the road surface. Accordingly, it is possible to detect the exact traveling state of the lawn mowing vehicle 1. Optical sensors, which radiate inspection light to the road surface and detect position information on the basis of reflected light, have been generally known as sensors that detect the traveling state of a vehicle. However, since the lawn mowing vehicle 1 travels on the lawn surface, it is difficult to secure inspection accuracy due to the disturbance of the light reflected from the lawn surface even though these optical sensors are used. Accordingly, it is effective to apply the free encoder 113, of which the road surface following property is enhanced as described above, to the lawn mowing vehicle 1.

Figure 18:
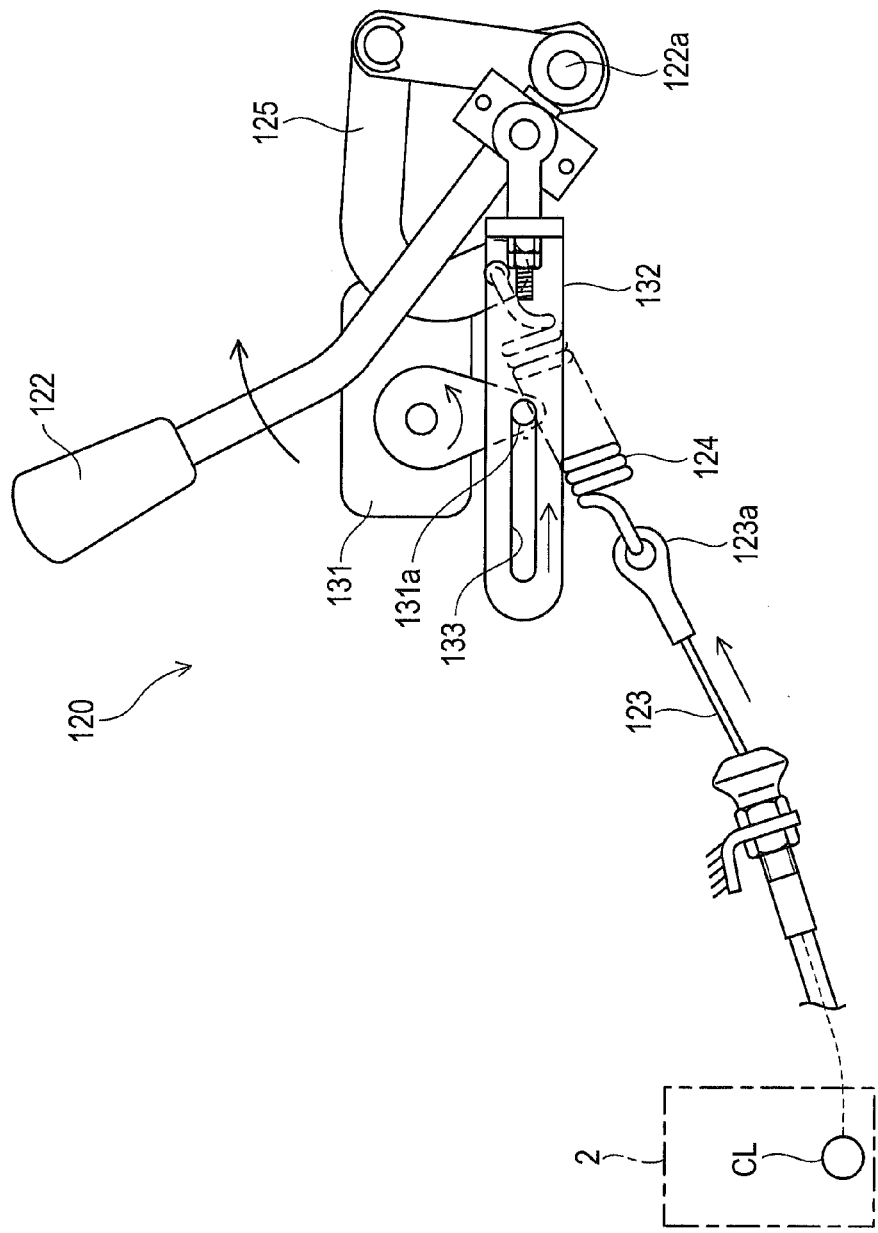
FIG. 18 is a view showing an operating mechanism that operates a cutting blade clutch of the lawn mowing unit.

The operating unit 13 shown in FIG. 1 includes operating mechanisms 120 and 140 that can be used to manually and automatically operate the lawn mowing unit 2. As shown FIG. 18, the operating mechanism 120 includes an operating lever 122 that is used to operate, for example, a cutting blade clutch CL of the lawn mowing unit 2. The operating lever 122 can be rotated about a rotating shaft 122a. The cutting blade clutch CL and the operating lever 122 are connected to each other by a wire 123. A coil spring 124, which suppresses the input of an excessive operating force, is provided at an end portion 123a of the wire 123. The coil spring 124 is connected to an intermediate mechanism 125 that transmits the operating force of the operating lever 122. Accordingly, when a user rotates the operating lever 122 in the direction of an arrow, the operating force of the operating lever 122 is transmitted to the wire 123 through the intermediate mechanism 125, so that the wire 123 is pulled. Therefore, it is possible to manually operate the cutting blade clutch CL.

The operating mechanism 120 includes a rotary actuator 131 as a drive mechanism and an interposed member 132 that is interposed between the operating lever 122 and the rotary actuator 131, in order to automatically operate the cutting blade clutch CL. One end of the interposed member 132 is linked to the operating lever 122, and the other end of the interposed member is connected to a pin 131a of the rotary actuator 131 through a long hole 133. The pin 131a is connected so as to be relatively rotatable while sliding in a long hole of the interposed member 132. When the rotary actuator 131 is rotated in the direction of an arrow, the interposed member 132 is moved in the direction of an arrow. Accordingly, the operating lever 122 can be rotated in the direction of an arrow. For this reason, it is possible to automatically operate the cutting blade clutch CL by controlling the rotary actuator 131. The pin 131a of the rotary actuator 131 and the interposed member 132 can be moved relative to each other while using both end portions of the long hole 133 as the limit of the movement thereof. Accordingly, when the operating lever 122 is manually moved, the interposed member 132 is moved relative to the pin 131a. Therefore, an operating force, which is caused by the manual operation of the operating lever 122, is not input to the rotary actuator 131. For this reason, it is possible to manually and automatically operate the cutting blade clutch CL by the operating mechanism 120.

Figure 19:
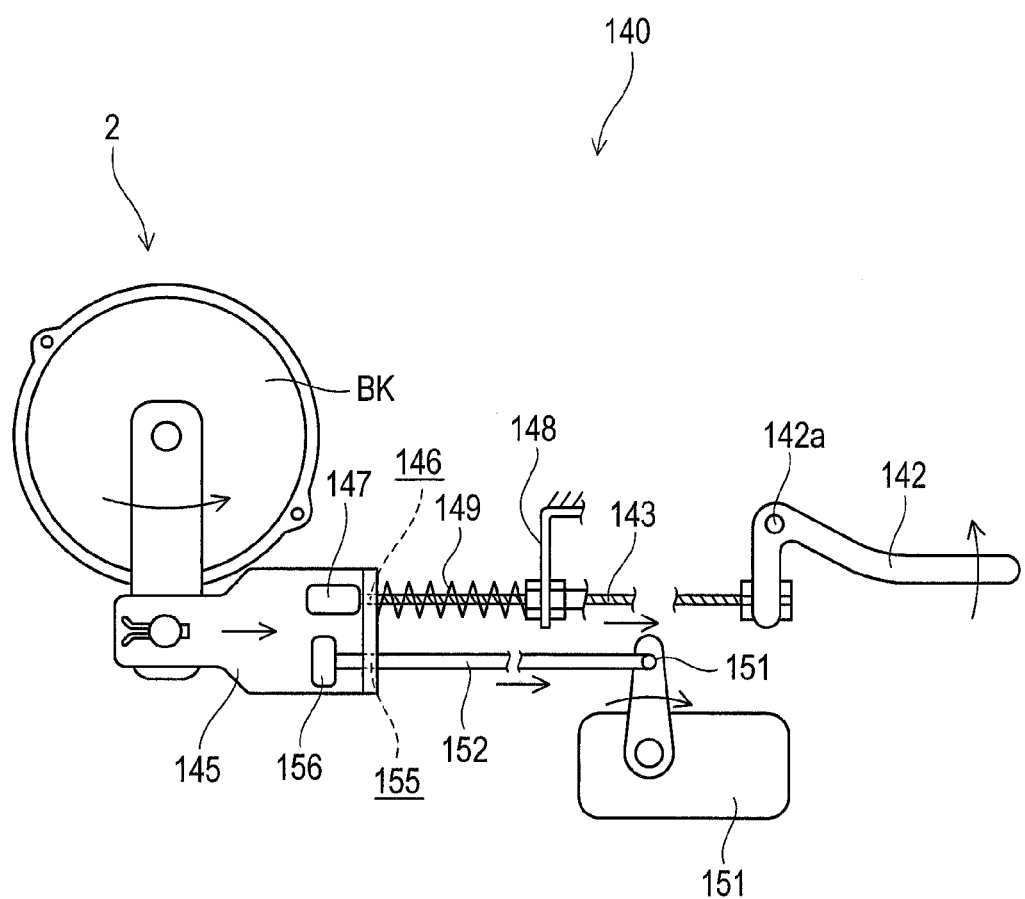
FIG. 19 is a view showing the operating mechanism that operates a brake of the lawn mowing unit.

As shown in FIG. 19, the operating mechanism 140 includes an operating lever 142 that is used to operate, for example, a brake BK of the lawn mowing unit 2. The operating lever 142 can be rotated about a rotating shaft 142a. A wire 143 is interposed between the brake BK and the operating lever 122. One end of the wire 143 is connected to the operating lever 142, and the other end of the wire 143 is connected to the brake BK by an intermediate member 145. A mounting hole 146, which has an inner diameter slightly larger than the diameter of the wire 143, is formed at the intermediate member 145. The wire 143 is inserted into the mounting hole 146, and a retaining member 147, which is sufficiently larger than the inner diameter of the mounting hole 146, is fixed to the end portion of the wire 143. Accordingly, when the operating lever 142 is operated in the direction of an arrow, the wire 143 is pulled in the direction of an arrow. Since the retaining member 147 is fixed to the end portion of the wire 143, the retaining member 147 bumps against the intermediate member 145. For this reason, the intermediate member 145 is pulled in the direction of an arrow, so that the brake BK is operated in the direction of an arrow. Accordingly, it is possible to manually operate the brake BK. The wire 143 is supported by the bracket 148, and a return spring 149 is provided between the bracket 148 and the intermediate member 145. For this reason, when the operating lever 142 is separated from an operating position, the operating lever 142 returns to an original position by an elastic force of the return spring 149.

The operating mechanism 140 includes a rotary actuator 151 as a drive mechanism and a rod 152 that is linked to a pin 151a of the rotary actuator 151, in order to automatically operate the brake BK. A mounting hole 155, which has an inner diameter slightly larger than the diameter of the rod 152, is formed at the intermediate member 145. The rod 152 is inserted into the mounting hole 155, and a retaining member 156, which is sufficiently larger than the inner diameter of the mounting hole 155, is fixed to the end portion of the rod 152. When the rotary actuator 151 is rotated in the direction of an arrow, the rod 152 is pulled in the direction of an arrow. Since the retaining member 156 is fixed to the end portion of the rod 152, the retaining member 156 bumps against the intermediate member 145. For this reason, the intermediate member 145 is pulled in the direction of an arrow, so that the brake BK is operated in the direction of an arrow. Accordingly, it is possible to automatically operate the brake BK by controlling the rotary actuator 151. As long as the intermediate member 145 does not bump against the retaining member 156 fixed to the end portion of the rod 152, the intermediate member 145 can be freely moved while the rod 152 is inserted into the intermediate member. For this reason, an operating force, which is caused by the manual operation of the operating lever 142, is not input to the rotary actuator 151. Further, even when the automatic operation of the brake is performed by the rotary actuator 151, likewise, the intermediate member 145 can be freely moved while the wire 143 is inserted into the intermediate member. Accordingly, the wire 143 and the operating lever 142 are not moved. For this reason, it is possible to manually and automatically operate the brake BK by the operating mechanism 140.

The invention is not limited to the above-mentioned embodiment, and may be embodied in various forms. The invention may be embodied in the form of an embodiment where only one steered wheel of the pair of steered wheels 40L and 40R is rotationally driven. If one steered wheel can be driven, it is possible to achieve the same traveling and turning patterns (see FIG. 7) as the traveling and turning patterns in the above-mentioned embodiment. Further, the invention may be embodied in the form of a sweeping vehicle on which a cleaning unit for cleaning the floor or the road surface is mounted or a snow plow vehicle on which a snow plow unit for clearing snow is mounted. The geometries of the steered wheel, such as the caster angle and the position of the king pin axis, may be appropriately set according to the contents of a work of the working unit: Furthermore, left and right non-steered wheels are not limited to the non-steered wheels shown in FIG. 4. For example, the non-steered wheels may be embodied in the form where left and right wheels, of which the lengths in the vehicle width direction are larger than the diameters, are rotationally mounted on one common axle.

CITATION LIST

Patent Literature

Patent Literature 1: JP-A-2004-166543

The invention claimed is:
1. A working vehicle comprising:
a working unit that includes non-steered wheels driven so as to rotate about an axis extending in a vehicle width direction as a rotational center;
a frame that is connected to the working unit; and
a steering drive device that is provided in the frame,
wherein the steering drive device includes a pair of steered wheels that is disposed in the vehicle width direction, a steering device that independently steers the pair of steered wheels respectively,
a driving device that rotationally drives at least one steered wheel of the pair of steered wheels,
a caster angle of the steering device is set to 0° with respect to each of the pair of steered wheels,
a king pin axis of the steering device is set to be orthogonal to a rotation axis of each of the pair of steered wheels, and the king pin axis of the steering device is set to a predetermined position that is separated from a middle of the width of each of the pair of steered wheels.

2. The working vehicle according to claim 1, further comprising:
a rocking member that extends in the vehicle width direction and is connected to the frame so as to rock about an oscillation axis extending in a longitudinal direction of a vehicle body,
wherein the pair of steered wheels is provided on the rocking member with the steering device interposed therebetween.

3. The working vehicle according to claim 1,
wherein the frame is connected to the working unit 2 so as to be rotatable about the axis and immovable in a direction of the axis.

4. The working vehicle according to claim 1,
wherein the predetermined position is a position on a boundary of a contact area where each of the pair of steered wheels comes into contact with a road surface, or a position close to the boundary.

5. A working vehicle comprising,
a working unit that includes non-steered wheels driven so as to rotate about an axis extending in a vehicle width direction as a rotational center;
a frame that is connected to the working unit; and
a steering drive device that is provided in the frame,
wherein the steering drive device includes a pair of steered wheels that is disposed in the vehicle width direction, a steering device that independently steers the pair of steered wheels respectively,
a driving device that rotationally drive at least one steered wheel of the pair of steered wheels, and
wherein the frame includes inclined portions that are connected to the working unit and extend obliquely toward the upper side of the working unit and horizontal portions that extend from the inclined portions in the lateral direction.

6. A working vehicle comprising,
a working unit that includes non-steered wheels driven so as to rotate about an axis extending in a vehicle width direction as a rotational center;
a frame that is connected to the working unit; and
a steering drive device that is provided in the frame,
wherein the steering drive device includes a pair of steered wheels that is disposed in the vehicle width direction, a steering device that independently steers the pair of steered wheels respectively,
a driving device that rotationally drives at least one steered wheel of the pair of steered wheels, and
the driving device includes driving parts that are provided at the pair of steered wheels respectively and the driving parts are disposed within the inner peripheries of the pair of steered wheels respectively.

7. A working vehicle comprising,
a working unit that includes non-steered wheels driven so as to rotate about an axis extending in a vehicle width direction as a rotational center;
a frame that is connected to the working unit; and
a steering drive device that is provided in the frame,
wherein the steering drive device includes a pair of steered wheels that is disposed in the vehicle width direction, a steering device that independently steers the pair of steered wheels respectively,
a driving device that rotationally drives at least one steered wheel of the pair of steered wheels, and
a lawn mowing unit, which is disposed on a vehicle body in front of the pair of steered wheels, is provided as the working unit, and
the lawn mowing unit includes a pair of rotating bodies, which is disposed adjacent to each other in the vehicle width direction and of which the lengths in the vehicle width direction are larger than the diameters of the non-steered wheels, and a cutting blade unit that is provided in front of the pair of rotating bodies and mows lawn.

8. The working vehicle according to claim 7,
wherein a caster angle of the steering device is set to 0° with respect to each of the pair of steered wheels, a king pin axis of the steering device is set to be orthogonal to a rotation axis of each of the pair of steered wheels, and the king pin axis of the steering device is set to a predetermined position that is separated from a middle of the width of each of the pair of steered wheels.

9. The working vehicle according to claim 8,
wherein the predetermined position is a position on a boundary of a contact area where each of the pair of steered wheels comes into contact with a road surface, or a position close to the boundary.

* * * * *